(12) United States Patent
Nair et al.

(10) Patent No.: US 11,501,147 B1
(45) Date of Patent: Nov. 15, 2022

(54) SYSTEMS AND METHODS FOR HANDLING PADDING REGIONS IN CONVOLUTION OPERATIONS

(71) Applicant: Meta Platforms, Inc., Menlo Park, CA (US)

(72) Inventors: Krishnakumar Narayanan Nair, Newark, CA (US); Ehsan Khish Ardestani, Newark, CA (US); Martin Schatz, Seattle, WA (US); Yuchen Hao, Fremont, CA (US); Abdulkadir Utku Diril, Menlo Park, CA (US); Rakesh Komuravelli, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 464 days.

(21) Appl. No.: 16/777,606

(22) Filed: Jan. 30, 2020

(51) Int. Cl.
| | |
|---|---|
| *G06N 3/04* | (2006.01) |
| *G06N 3/063* | (2006.01) |
| *G06N 3/08* | (2006.01) |

(52) U.S. Cl.
CPC .............. *G06N 3/063* (2013.01); *G06N 3/04* (2013.01); *G06N 3/08* (2013.01)

(58) Field of Classification Search
CPC ............. G06N 3/063; G06N 3/04; G06N 3/08
See application file for complete search history.

(56) References Cited

U.S. PATENT DOCUMENTS 11,120,328 B1 * 9/2021 Nair ..................... G06F 17/16

OTHER PUBLICATIONS

Hadjis et al., "Caffe con Troll: Shallow Ideas to Speed Up Deep Learning", Proc Fourth Workshop Data Anal Scale Danac, May 26, 2015, pp. 1-19.
Loukadakis et al., "Accelerating Deep Neural Networks on Low Power Heterogeneous Architectures", URL: https://www.researchgate.net/publication/327070011, Jan. 24, 2018, 15 pages.
Chen et al., "Eyeriss: A Spatial Architecture for Energy-Efficient Dataflow for Convolutional Neural Networks", ACM/IEEE 43rd Annual International Symposium on Computer Architecture, Jun. 18-22, 2016, pp. 367-379.
Warden, Pete, "Why GEMM is at the heart of deep learning", URL: https://petewarden.com/2015/04/20/why-gemm-is-at-the-heart-of-deep-learning/, Apr. 20, 2015, 12 pages.

* cited by examiner

*Primary Examiner* — Kyoung Lee
(74) *Attorney, Agent, or Firm* — FisherBroyles, LLP

(57) ABSTRACT

A disclosed computer-implemented method may include maintaining, within a local memory device (LMD) included in a hardware accelerator (1) a filter matrix corresponding to a filter location included in each of a set of filters of a convolutional layer of an artificial neural network (ANN), and (2) a set of activation vectors corresponding to an active region of an activation volume input into the convolutional layer. The method may also include determining that the active region of the activation volume is contiguous with a padding region associated with at least a portion of the activation volume. The method may further include directing a matrix multiplication unit (MMU) included in the hardware accelerator to execute a matrix multiplication operation (MMO) using the filter matrix and an activation matrix that may include (1) the set of activation vectors, and (2) at least one padding vector corresponding to the padding region.

20 Claims, 20 Drawing Sheets

SYSTEMS AND METHODS FOR HANDLING PADDING REGIONS IN CONVOLUTION OPERATIONS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
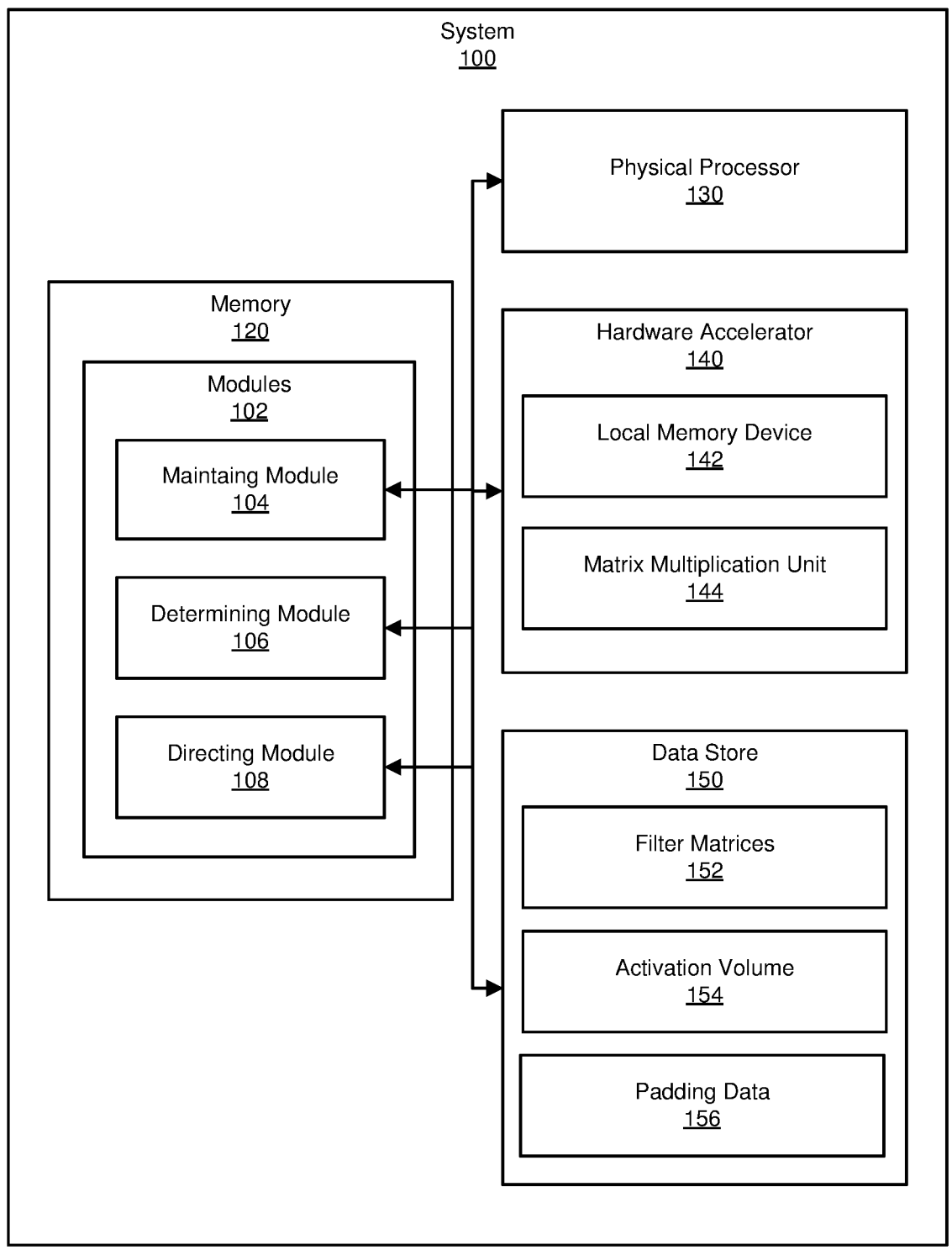
FIG. 1 is a block diagram of an example system for handling padding regions in convolution operations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Artificial intelligence (AI) may enable computers to perform various complicated tasks, such as those related to cognitive functions that are typically associated with humans. These functions often involve making predictions or assessments based on real-world inputs. Several approaches to AI are prevalent, including machine learning techniques. Machine learning systems, in at least some examples, may be trained using known data sets rather than employing a specific predetermined algorithm to perform a task.

One machine learning model, referred to as an artificial neural network (ANN), may be inspired by the interconnections of neurons in a biological brain. Typically, ANNs may include multiple computational nodes arranged in interconnected layers, with each node modeling a neuron that may receive one or more inputs, process the inputs, and pass an output to the next layer, with the final layer producing a desired output. One such layer that may be included in an ANN may be a convolutional layer. A convolutional layer may apply a convolution operation to an input and may pass the result to another layer.

Unfortunately, traditional approaches to performing such convolution operations may require and/or consume high amounts of computing and/or power resources. For example, traditional approaches may require and/or utilize components and/or computing techniques that may consume a high amount of power resources. Additionally, such power-hungry hardware components and/or computing techniques may complicate designs of systems that may utilize such convolutional layers.

Furthermore, some conventional, traditional, and/or existing systems and methods for performing convolution operations that may reduce power consumption may not effectively or efficiently implement some important operations for convolutional layers of ANNs such as haloing or padding of input volumes. Hence, the present application identifies and addresses a need for new systems and methods for reducing power consumption of convolution operations for ANNs while also efficiently handling halo or padding regions in convolution operations.

The present disclosure is generally directed to systems and methods for efficiently handling padding regions in convolution operations of ANNs. As will be explained in greater detail below, an example embodiment may include a hardware accelerator that may include a local memory device (LMD) and an MMU.

The example embodiment may maintain a filter matrix within the LMD. The filter matrix may include a set of filter vectors, each corresponding to a filter location (e.g., $w_{1,1}$, $w_{1,2}$, $w_{R,S}$) included in each filter included in a set of filters associated with a convolutional layer of an ANN (e.g., filters $K_1$ to $K_m$). The example embodiment may also maintain, within the LMD, a set of activation vectors corresponding to an active region of an activation volume. Each activation vector may correspond to a location within an activation volume (e.g., $x_{1,1}$, $x_{1,2}$, ... $x_{H,W}$) such as a pixel within an image. Furthermore, each activation vector may include values corresponding to channels of the activation volume (e.g., $c_1$, $c_2$, ... $c_k$).

The example embodiment may also determine that the active region of the activation volume is contiguous with a padding region associated with at least a portion of the activation volume. As will be explained in greater detail below, a padding region may be associated with (e.g., surround, abut, have a continuity with) an activation volume and may facilitate some convolution operations involving the activation volume and the filter.

The example embodiment may further direct the MMU included in the hardware accelerator to execute an MMO using the filter matrix and an activation matrix that may include (1) the set of activation vectors, and (2) at least one padding vector corresponding to the padding region. In some examples, the hardware accelerator may maintain or generate the padding vector, thus obviating a requirement that the padding vector be transferred to the MMU from a processor or storage medium remote from the hardware accelerator (e.g., a data store that may also store an activation volume and/or a set of filter matrices).

As mentioned above, traditional and/or conventional options for performing convolution operations may have many drawbacks. For example, such conventional and/or traditional options for performing convolution operations may involve rearranging image blocks into columns, such as via one or more "im2col" operations. This may require steering at an element-wise level, necessitating elaborate uses of multiplexers ("muxes") that may consume power and complicate designs of such systems. Additionally, large sizes of rearranged image blocks and/or columns may lead to large data transfers between system components (e.g., between a processor and a memory device), thereby further increasing power consumption. Furthermore, such conventional and/or traditional systems may fail to take advantage of spatial reuse that may be available for convolution operations.

As will be made apparent by the following description, the systems and methods described herein may provide many benefits over conventional methods for performing convolution operations for ANNs. For example, by vastly increasing reuse of values stored in fast, power-efficient memory local to a hardware accelerator, the systems and methods described herein may provide significant power savings over conventional solutions for performing convolution operations that may require a higher number of power-consuming data access and/or transfer operations. Moreover, the systems and methods described herein may also efficiently handle padding or halo regions of activation volumes without requiring maintaining or transferring of padding data from and to the hardware accelerator.

Additionally, the systems and methods described herein may translate strides of convolution operations into simple line reads, thereby obviating a requirement for one or more complicated hardware and/or software muxing schemes that may be employed by conventional solutions for performing convolutions. This may enable both simplified memory organization schemes as well as reduced power consumption while performing convolution operations.

Some systems may provide for reuse of filter weights and/or activation values across a single dimension of an activation volume (e.g., a width (W) dimension of an activation volume). An example may be one or more systems and/or methods disclosed in U.S. patent application Ser. No. 16/354,665, filed Mar. 15, 2019, titled "Systems and Methods for Reducing Power Consumption of Convolution Operations for Artificial Neural Networks," and incorporated herein in its entirety by this reference. However, the systems and methods disclosed herein may provide for and/or enable efficient handling of padding or halo regions associated with activation volumes. The systems and methods described herein may provide additional efficiencies over conventional, traditional, or existing convolution methods.

The following will provide, with reference to FIGS. 1-2 and 4-19, detailed descriptions of systems for reducing power consumption of convolution operations for ANNs while efficiently handling padding regions associated with activation volumes. Detailed descriptions of corresponding computer-implemented methods will also be provided in connection with FIG. 3.

FIG. 1 is a block diagram of an example system 100 for handling padding regions in convolution operations. As illustrated in this figure, example system 100 may include one or more modules 102 for performing one or more tasks. As will be explained in greater detail below, modules 102 may include a maintaining module 104 that maintains, within an LMD included in a hardware accelerator, (1) a filter matrix corresponding to a filter location included in each of a set of filters of a convolutional layer of an ANN, and (2) a set of activation vectors corresponding to an active region of an activation volume input into the convolutional layer.

As further illustrated in FIG. 1, example system 100 may also include a determining module 106 that determines that the active region of the activation volume is contiguous with a padding region associated with at least a portion of the activation volume. Additionally, example system 100 may further include a directing module 108 that directs an MMU included in the hardware accelerator to execute a matrix multiplication operation (MMO) using the filter matrix and an activation matrix that may include (1) the set of activation vectors, and (2) at least one padding vector corresponding to the padding region.

As also illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, directing module 108 may further determine a set of output activation values for the convolutional layer of the ANN based on accumulated outputs of the MMO and an additional set of additional MMOs.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate efficient handling of halo regions in convolution operations. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As also shown in FIG. 1, example system 100 may also include a hardware accelerator 140. In some examples, a "hardware accelerator" may include a hardware component or device that performs one or more specialized computing tasks more efficiently, in hardware, than the computing task would be performed in software by a general-purpose central processing unit (i.e., a computing chip that is structured to execute a range of different programs as software). In some examples, "hardware acceleration" may refer to the execution of a computing task in application-specific hardware circuitry that occurs in the absence of a software module intermediary or other layer of abstraction, such that the performance of the application is more efficient than when executed otherwise.

In some examples, as shown in FIG. 1, hardware accelerator 140 may include an LMD 142. LMD 142 generally represents any type or form of volatile or non-volatile storage device or medium capable of storing data and/or computer-readable instructions and that may be included in a hardware accelerator. In one example, LMD 142 may store, load, receive, and/or maintain one or more matrices that may be local to (e.g., communicatively coupled via a high-speed, low-power, and/or low-latency bus), accessed, and/or utilized by one or more MMUs included in hardware accelerator 140. Examples of LMD 142 may include, without limitation, one or more RAM devices included in a hardware accelerator, one or more physical memory devices organized in one or more cache levels, a general cache, an instruction cache, variations or combinations of one or more of the same, and/or any other suitable storage memory device local to an MMU included in a hardware accelerator. In some examples, it may be more efficient (e.g., in terms of power usage, processing resource usage, etc.), for one or more components of system 100 and/or hardware accelerator 140 to access data and/or computer-readable instructions from LMD 142 than another data storage device that may not be included in hardware accelerator 140 (e.g., memory 120, data store 150, etc.).

In one example, hardware accelerator 140 may include application-specific hardware circuitry designed to perform a specific computing task. For example, as shown in FIG. 1, hardware accelerator 140 may include an MMU 144 (shown in FIGS. 1 and 2 as "matrix multiplication unit 144"). MMU 144 may include any hardware component designed to execute one or more MMOs. For example, as will be described in greater detail below, MMU 144 may be designed to, when provided with a multiplier matrix and a multiplicand matrix, execute an MMO using the multiplier matrix and the multiplicand matrix. Examples of MMUs may include, without limitation, programmable matrix-multiply-and-accumulate units, microprocessors that implement MMOs, FPGAs that implement MMOs, ASICs that implement MMOs, portions of one or more of the same, variations or combinations of one or more of the same, and/or any other suitable hardware designed and/or configured to perform MMOs. In some examples, an MMO may include a generalized matrix multiplication (GEMM) operation.

In one or more examples, a multiplier matrix may be in a form of m×k and a multiplicand matrix may be in a form of n×k, where m may represent a number of rows in the multiplier matrix, k may represent a number of columns in the multiplier matrix and a number of rows in the multiplicand matrix, and n may represent a number of columns in the multiplicand matrix. In some examples, this form may be referred to as m×k×n (e.g., 8×8×8, 16×16×16, 32×32×32, 8×16×8, and so forth).

In some examples, MMU 144 may be designed to efficiently execute MMOs using multiplier and/or multiplicand matrices having predetermined and/or specified dimensions. For example, as will be described in greater detail below, MMU 144 may be designed and/or configured to efficiently execute MMOs using multiplier and multiplicand matrices with combined dimensions, in accordance with an m×k×n form as described above, of 8×8×8, 16×16×16, 32×32×32, 64×64×64, 8×16×8, 16×32×16, and so forth.

As also shown in FIG. 1, example system 100 may also include one or more data stores, such as data store 150, that may receive, store, and/or maintain data. Data store 150 may represent portions of a single data store or computing device or a plurality of data stores or computing devices. In some embodiments, data store 150 may be a logical container for data and may be implemented in various forms (e.g., a database, a file, a file system, a data structure, etc.). Examples of data store 150 may include, without limitation, files, file systems, data stores, databases, and/or database management systems such as an operational data store (ODS), a relational database, a NoSQL database, a NewSQL database, and/or any other suitable organized collection of data.

In at least one example, data store 150 may include (e.g., store, host, access, maintain, etc.) filter matrices 152. As will be explained in greater detail below, in some examples, filter matrices 152 may include information including and/or associated with one or more filters associated with a convolutional layer of an ANN. In some examples, data store 150 may additionally include (e.g., store, host, access, maintain, etc.) an activation volume 154. As will be described in greater detail below, activation volume 154 may include any set of data that may serve as input (e.g., an input volume) to a convolutional layer of an ANN, such as one or more digital images. In at least some embodiments, data store 150 may also include (e.g., store, host, access, maintain, etc.) padding data 156. As will be described in greater detail below, padding data 156 may include any set of data that may indicate that an active region of activation volume 154 (e.g., one or more activation vectors included in activation volume 154) may be associated with (e.g., may adjoin, may be surrounded by, etc.) a padding region. In some examples, padding data 156 may be associated with the convolutional layer of the ANN and/or one or more filters associated with the convolutional layer of the ANN.

Figure 2A:
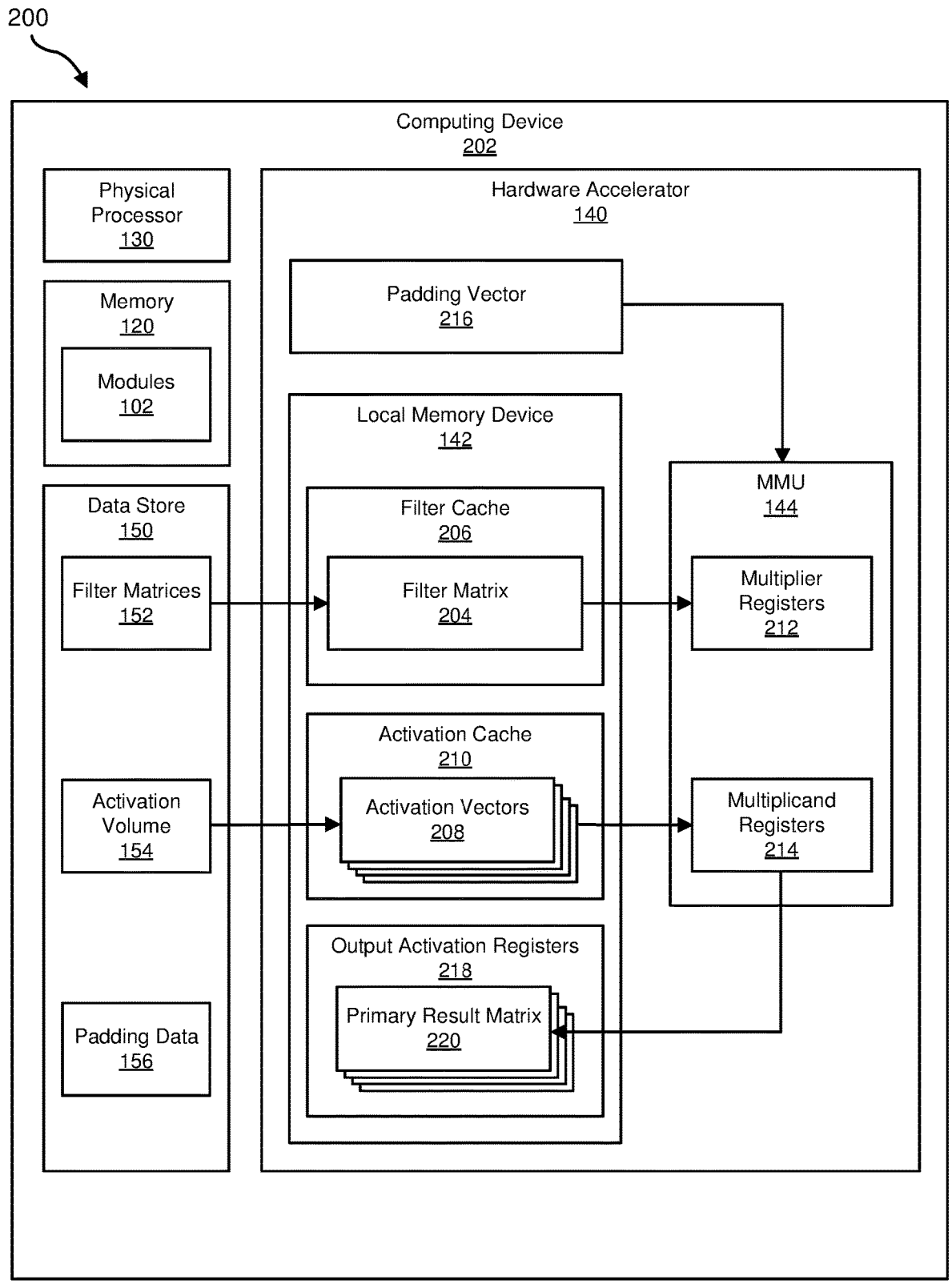
FIGS. 2A and 2B are block diagrams of an example implementation of a system for handling padding regions in convolution operations.
Figure 2B:
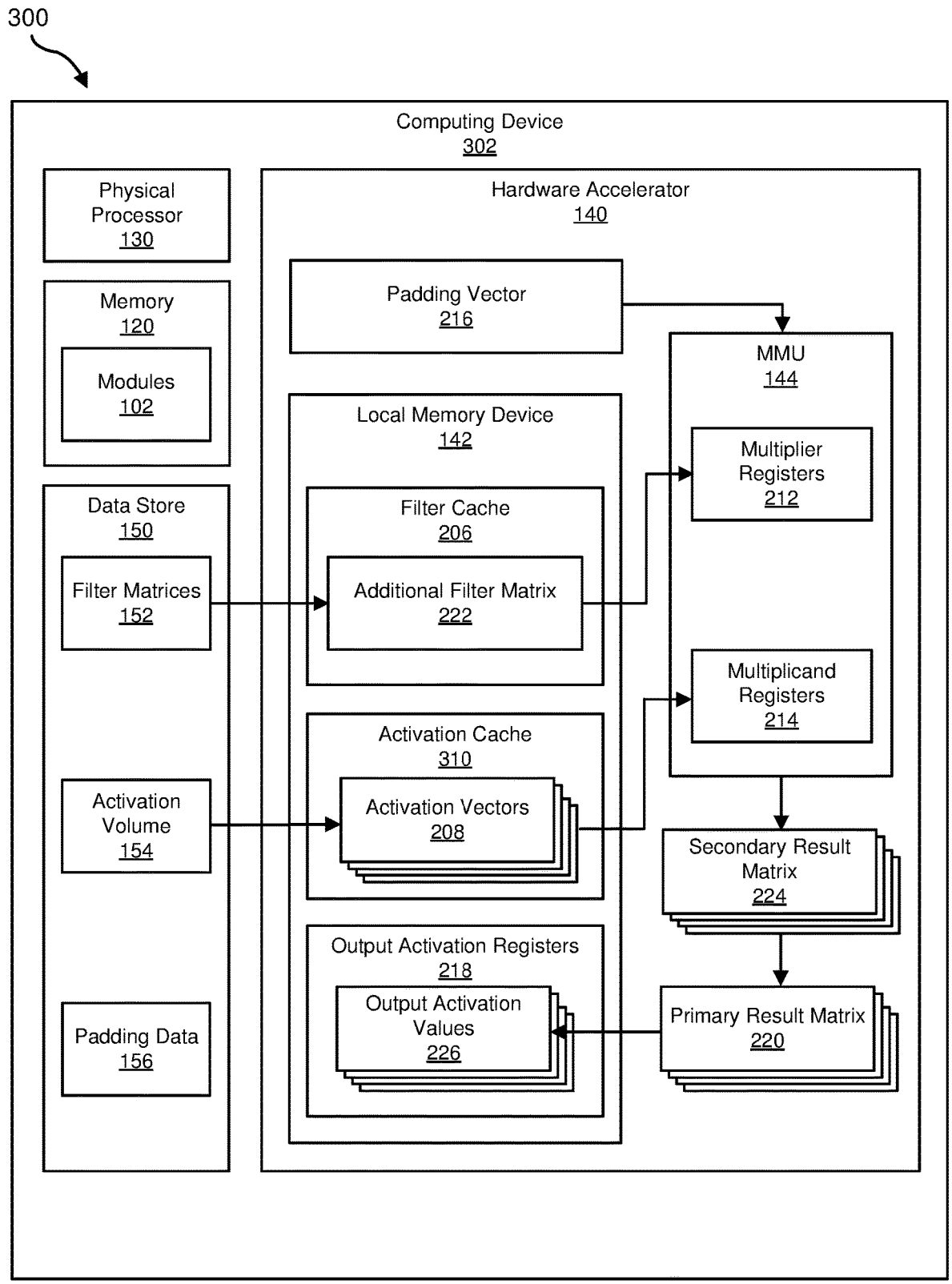

Example system 100 in FIG. 1 may be implemented in a variety of ways. For example, all or a portion of example system 100 may represent portions of an example system 200 ("system 200") in FIGS. 2A and 2B (collectively, FIG. 2). As shown in FIGS. 2A and 2B, system 200 may include a computing device 202. In at least one example, computing device 202 may be programmed with one or more of modules 102.

In at least one embodiment, one or more of modules 102 from FIG. 1, when executed by computing device 202, may enable computing device 202 to perform one or more operations to efficiently handle halo regions in convolution operations as described herein. For example, as will be described in greater detail below, maintaining module 104 may, when executed by computing device 202, cause computing device 202 to maintain, within an LMD included in a hardware accelerator (e.g., within LMD 142 included in hardware accelerator 140), a filter matrix (e.g., filter matrix 204) corresponding to a filter location included in each of a set of filters of a convolutional layer of an ANN.

In some examples, maintaining module 104 may maintain the filter matrix within a filter cache (e.g., filter cache 206) included in the LMD. Furthermore, in some examples, the filter matrix may include a set of filter vectors that may each correspond to a filter location (e.g., $w_{1,1}$, $w_{1,2}$, etc.) included in each filter included in a set of filters (e.g., filters $K_1$ to $K_m$) associated with a convolutional layer of an ANN.

Additionally, maintaining module 104 may, when executed by computing device 202, cause computing device 202 to maintain a set of activation vectors (e.g., activation vectors 208) that may correspond to an active region of an activation volume (e.g., activation volume 154) input into the convolutional layer. In some examples, each activation vector may be included in a row of the activation volume (e.g., row $x_{1,*}$, row $x_{2,*}$, etc.). In some examples, maintaining module 104 may maintain the activation vectors within an activation cache (e.g., activation cache 210) included in the LMD.

In some examples, maintaining module 104 may maintain the filter matrix within the LMD by loading the filter matrix into the filter cache from a data store (e.g., from filter matrices 152 included in data store 150). In at least one example, maintaining module 104 may maintain the plurality of activation matrices by loading each activation matrix included in the plurality of activation matrices into the activation cache from the data store (e.g., from activation volume 154 included in data store 150).

In some examples, the LMD may include a set of multiplier registers (e.g., multiplier registers 212) and/or a set of multiplicand registers (e.g., multiplicand registers 214) associated with the MMU.

In additional examples, maintaining module 104 may maintain the filter matrix within the LMD by loading, from a data store (e.g., data store 150), the filter matrix to the set of multiplier registers (e.g., via filter cache 206). Additionally, in some examples, maintaining module 104 may maintain the set of activation vectors within the LMD by loading, from the data store, the set of activation vectors to the set of multiplicand registers (e.g., via activation cache 210).

In some embodiments, determining module 106 may, when executed by computing device 202, cause computing device 202 to determine that the active region of the activation volume is contiguous with a padding region associated with at least a portion of the activation volume. Furthermore, in some embodiments, directing module 108 may, when executed by computing device 202, cause computing device 202 to direct an MMU included in the hardware accelerator (e.g., MMU 144 included in hardware accelerator 140) to execute an MMO using the filter matrix and an activation matrix that may include (1) the set of activation vectors, and (2) at least one padding vector (e.g., padding vector 216) corresponding to the padding region.

In some examples, directing module 108 may direct MMU 144 to execute one or more MMOs using a first matrix as a multiplier matrix and a second matrix as a multiplicand matrix. In some examples, directing module 108 may direct MMU 144 to execute one or more MMOs by loading a first matrix (e.g., a filter matrix) into the set of multiplier registers (e.g., multiplier registers 212) and loading a second matrix (e.g., an activation matrix) into the set of multiplicand registers (e.g., multiplicand registers 214). Thus, when MMU 144 executes the MMO, MMU 144 may use the first matrix (e.g., the filter matrix) as a multiplier matrix and the second matrix (e.g., the activation matrix) as a multiplicand matrix.

In some examples, the hardware accelerator may further include a set of output activation registers (e.g., output activation registers 218) associated with the MMU. In at least one example, directing module 108 may direct the MMU to execute the MMO using the filter matrix and the activation matrix by generating a primary result matrix (e.g., primary result matrix 220) by directing the MMU to execute the MMO using the filter matrix as a multiplier matrix and the activation matrix as a multiplicand matrix. Directing module 108 may also store the primary result matrix within the set of output activation registers.

In some examples, one or more of modules 102 (e.g., maintaining module 104, determining module 106, and/or directing module 108) may replace (e.g., replace within and/or load into the filter cache 206) the filter matrix with an additional filter matrix (e.g., additional filter matrix 222) corresponding to an additional filter location. In some examples, the filter matrix may correspond to a primary filter location (e.g., $w_{1,1}$) and the additional filter matrix may correspond to a secondary filter location (e.g., $w_{1,2}$). Furthermore, in some embodiments, one or more of modules 102 may replace at least one activation vector included in the set of activation vectors with an additional activation vector included in the activation volume. Directing module 108 may further direct the MMU to execute an additional MMO using the additional filter matrix and the activation matrix.

Additionally, in at least one example, directing module 108 may direct the MMU to execute an additional MMO using the additional filter matrix and the activation matrix by producing a secondary result matrix (e.g., secondary result matrix 224). Directing module 108 may produce the secondary result matrix by directing the MMU to execute the additional MMO using the additional filter matrix as the multiplier matrix and the activation matrix as the multiplicand matrix. Directing module 108 may further accumulate the secondary result matrix and the primary result matrix and may store a result of accumulating the secondary result matrix and the primary result matrix within the set of output activation registers.

Moreover, in at least one embodiment, one or more of modules 102 (e.g., maintaining module 104, directing module 108, replacing module 108, directing module 108, etc.) may further determine, based on the result of accumulating the secondary result matrix and the primary result matrix, an output activation value (e.g., output activation value 226) for the convolutional layer of the ANN.

Computing device 202 generally represents any type or form of computing device capable of reading and/or executing computer-executable instructions and/or hosting executables. Examples of computing device 202 may include, without limitation, application servers, storage servers, database servers, web servers, and/or any other suitable computing device configured to run certain software applications and/or provide various application, storage, and/or database services.

In at least one example, computing device 202 may be a computing device programmed with one or more of modules 102. All or a portion of the functionality of modules 102 may be performed by computing device 202 and/or any other suitable computing system. As will be described in greater detail below, one or more of modules 102 from FIG. 1 may, when executed by at least one processor of computing device 202, may enable computing device 202 to reduce power consumption of convolution operations for ANNs.

Many other devices or subsystems may be connected to example system 100 in FIG. 1 and/or example system 200 in FIG. 2. Conversely, all the components and devices illustrated in FIGS. 1 and 2 need not be present to practice the embodiments described and/or illustrated herein. The devices and subsystems referenced above may also be interconnected in different ways from those shown in FIG. 2. Example system 100 and example system 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
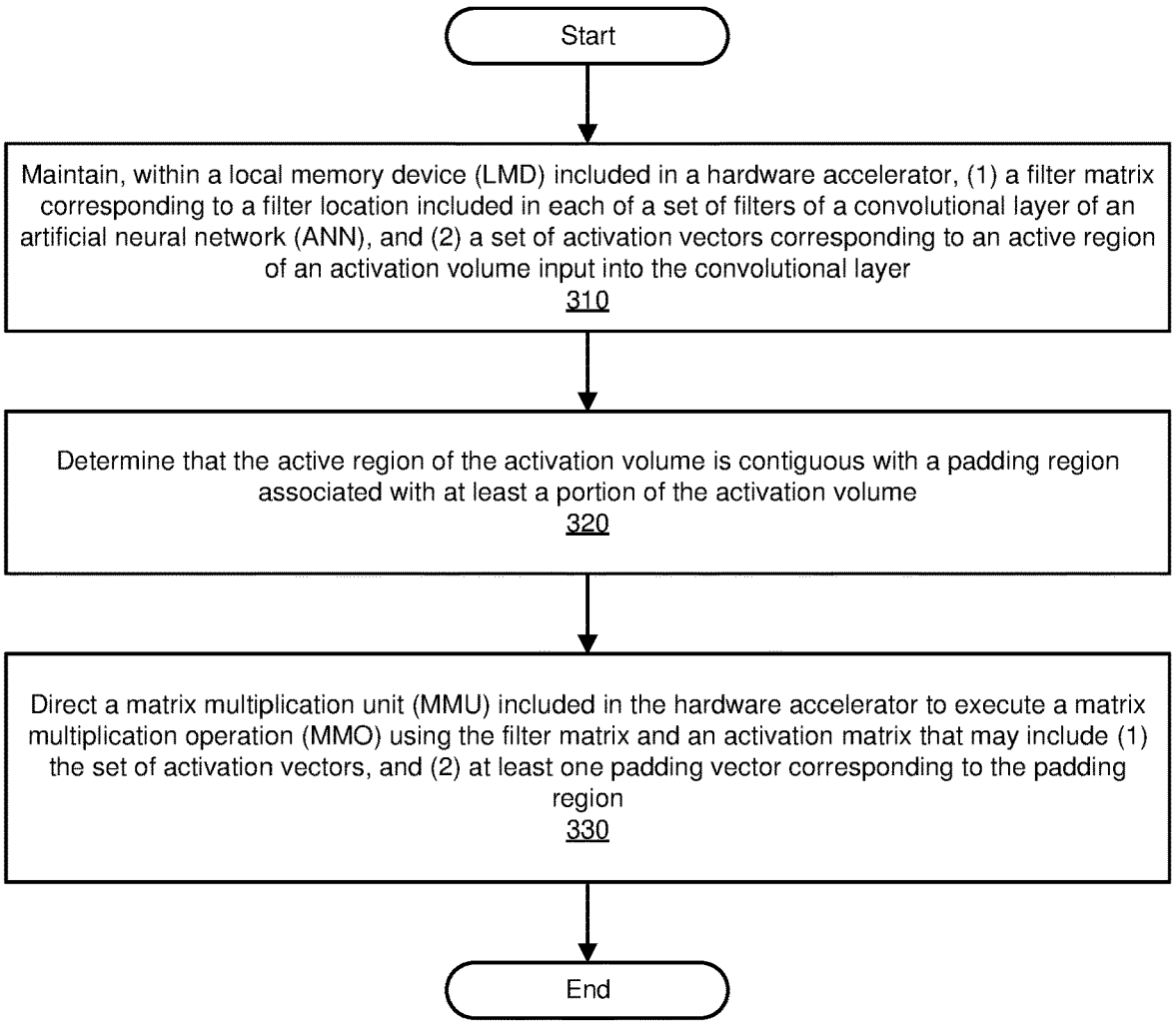
FIG. 3 is a flow diagram of an example method for handling padding regions in convolution operations.

FIG. 3 is a flow diagram of an example computer-implemented method 300 for allocating shared resources in multi-tenant environments. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may maintain, within a LMD included in a hardware accelerator, (1) a filter matrix corresponding to a filter location included in each of a set of filters of a convolutional layer of an ANN, and (2) a set of activation vectors corresponding to an active region of an activation volume input into the convolutional layer. For example, maintaining module 104 may, as part of computing device 202, maintain, within LMD 142 included in hardware accelerator 140, (1) filter matrix 204, and (2) activation vectors 208.

In some examples, a "filter" may include an array or matrix of weight values that may, as part of a convolution operation, be convolved with an input volume (e.g., an activation volume, an image, etc.) to generate an output activation map and/or output volume associated with the filter and the input volume.

In some examples, an "activation volume" may include any set of data that may serve as input (e.g., an input volume) to a convolutional layer of an ANN as described herein. In some examples, an activation volume may include a set of data that may be represented as one or more channels or channel matrices. In some examples, a "channel" or a "channel matrix" may include data associated with a portion of a filter or a portion of an activation volume.

For example, an activation volume may include a digital image that may be represented as one or more matrices, where each matrix may correspond to a different color channel of the image. A color digital image may include a red channel, a green channel, and/or a blue channel. Likewise, a monochrome image may include only a single channel (e.g., a brightness channel). Hence, an activation volume that includes a digital representation of a color image may include a red channel matrix, a blue channel matrix, and a green channel matrix. In such examples, the red channel matrix may include data associated with a red channel of the image, the green channel matrix may include data associated with a green channel of the image, and the blue channel matrix may include data associated with the blue channel.

An activation volume may also include one or more pixels that may include one or more values corresponding to one or more channels at a particular location within the activation volume. For example, an activation volume may include a digital image that may be represented by a red channel matrix, a blue channel matrix, and a green channel matrix. A pixel at a location x within the image (e.g., $x_{1,1}$, $x_{1,2}$, $x_{1,3}$, etc.) may include a red channel value, a green channel value, and a blue channel value.

Likewise, filters may include one or more channels, where each channel may be convolved with a corresponding channel in the activation volume. In such examples, an output value may be determined by accumulating each result of a channel convolution with the results of the other channel convolutions. For example, if a convolution of a filter with a portion of an input volume resulted in a red channel value of 4, a green channel value of 3, and a red channel value of 5, an output value for the convolution of the filter with the portion of the input volume may be 12.

While examples of red, green, and blue channels of color images may be convenient for descriptive and conceptual purposes, these are examples only, and not intended to be limiting. In other examples, filters and/or activation volumes may include any number of channels and/or channel matrices.

In some examples, an activation volume and a filter that may be convolved with the activation volume may have a common channel depth. In some examples, a "channel depth" may include a number of channels shared by the activation volume and the filter. For example, an activation volume may include sixteen channels and a filter that may be convolved with the activation volume may include sixteen channels.

Figure 4:
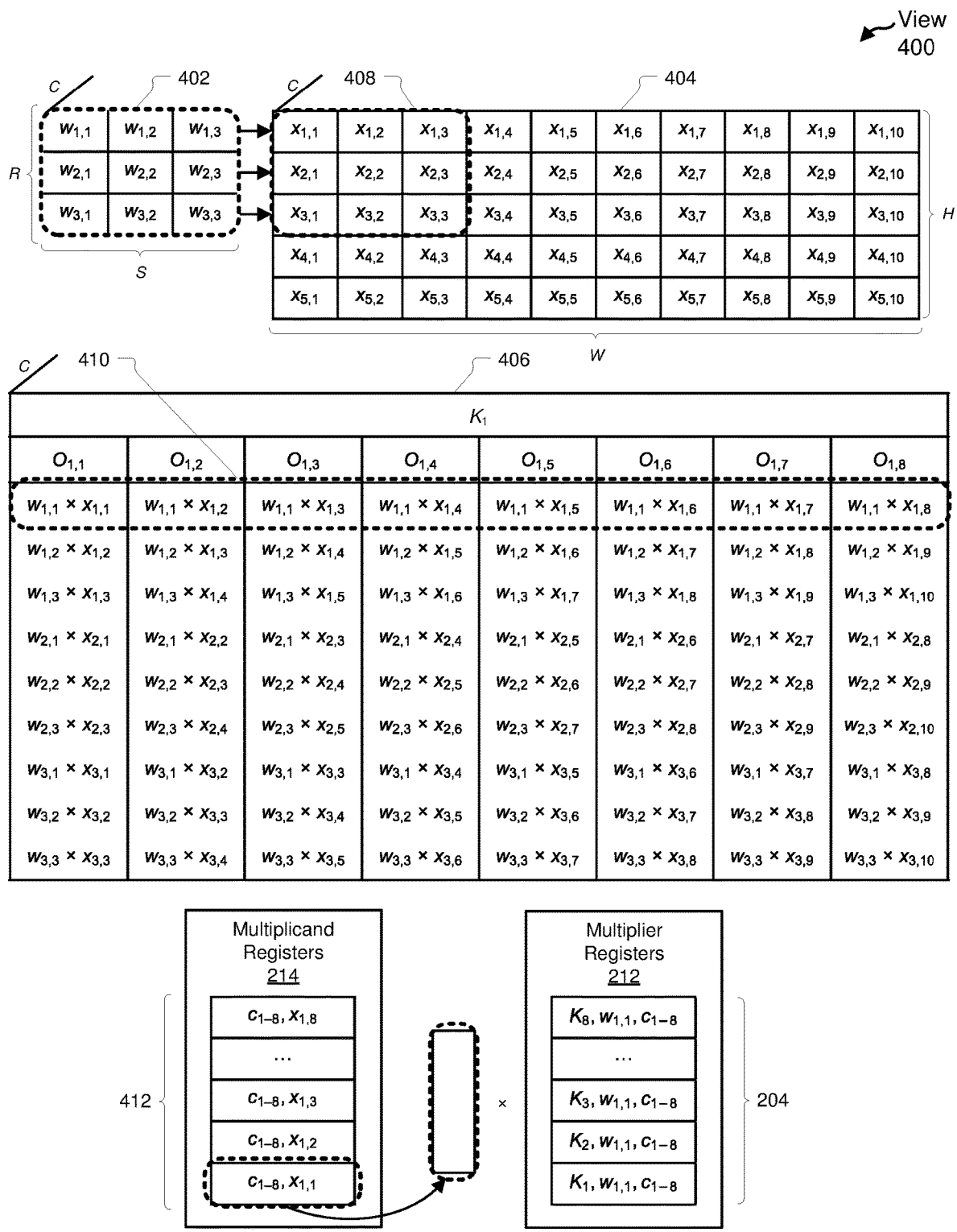
FIGS. 4-5 illustrate generating a result matrix by directing a matrix multiplication unit (MMU) included in a hardware accelerator to execute a matrix multiplication operation (MMO) using a filter matrix as a multiplier matrix and an activation matrix as a multiplicand matrix as described herein.

By way of illustration, FIG. 4 shows a view 400 of a filter 402 and an activation volume 404. As shown, filter 402 may be represented by a two-dimensional matrix having R=3 rows and S=3 columns. Each value in filter 402 may be a weight value and may be represented by its location within filter 402. For example, $w_{1,1}$ represents a weight value at a first row and first column of filter 402. Although filter 204 may only show 3×3 weight values (e.g., filter vectors) in FIG. 4, filter matrix 204 may have any suitable dimensions and/or may extend any distance in any direction.

Note that, in some examples, an ANN and/or a convolutional layer of an ANN may include and/or be associated with more than one filter. For example, filter 402 may be one of multiple filters associated with a convolutional layer of an ANN and may therefore be designated as $K_1$. Likewise, a second filter associated with a convolutional layer of the ANN may be designated as $K_2$, a third filter may be designated as $K_3$, and so forth.

Activation volume 404 may be represented by a two-dimensional matrix having H=5 rows and W=10 columns. Each value in activation volume 404 may be a pixel value and may be represented by its location within filter 402. For example, $x_{1,1}$ may represent a pixel value at a first row, first column of activation volume 404. Although activation volume 404 may only show 5×10 pixels (e.g., activation vectors) in FIG. 4, activation volume 404 may have any suitable dimensions and/or may extend any distance in any direction.

As further shown in FIG. 4, both filter 402 and activation volume 404 may also have an associated channel depth C. This may indicate that both filter 402 and activation volume 404 may include and/or are associated with C channels. For example, filter 402 and activation volume 404 may each include and/or be associated with a red channel, a green channel, and a blue channel. For simplicity of presentation and explanation, filter 402 and activation volume 404 only show one of the C channels that may be included in and/or may be associated with filter 402 and activation volume 404. Notwithstanding this appearance, a filter (e.g., filter 402) and/or an activation volume (e.g., activation volume 404) may include any suitable number of channels.

Particular values (e.g., weight values, pixel values, etc.) corresponding to locations within filters, activation volumes, and/or channels may be denoted herein in a variety of ways. For example, suppose a particular convolutional layer of an ANN is associated with eight filters (e.g., $K_1$ to $K_8$, also denoted herein as $K_{1-8}$) that may be convolved with an activation volume. Further suppose that each filter has a width R, a height S, and a channel depth of C. An upper left corner of a first channel may be referred to as ($w_{1,1}$, $c_1$), which may denote a weight value within a first row and a first column of a first channel of the filter. Likewise, a weight value within a first row and a first column of a second channel of the filter may be denoted as ($w_{1,1}$, $c_2$).

Furthermore, a pixel value in a first row and first column of an activation volume may be denoted by $x_{1,1}$. Likewise, a pixel value in a first row, first column, and first channel of an activation volume may be denoted by $x_{1,1}$, $c_1$ and/or ($x_{1,1}$, $c_1$). In some examples, an activation vector or set of pixel values associated with a first row and first column of an activation volume having eight channels may be denoted by $x_{1,1}$, $c_8$), ($x_{1,1}$, $c_{1-8}$), ($x_{1,1}$, $c_1 \ldots c_8$), and/or ($x_{1,1}$, $c_1$) to ($x_{1,1}$, $c_8$). In some examples, an "activation vector" may include a vector that includes a set of pixel values associated with a location and a set of channels included in an activation volume, such as ($x_{1,2}$, $c_{1-8}$), ($x_{10,20}$, $c_{3-10}$), and so forth.

Note that, in many examples involving matrices herein, matrix elements may be listed in a "row, column" format. Hence, when a matrix includes pixel locations arranged in rows of the matrix and channels arranged in columns of the matrix, pixel locations may be listed before channels (e.g., ($x_{1,1}$, $c_2$)). Likewise, when a matrix includes channels arranged in rows of the matrix and pixel locations arranged in columns of the matrix, channels may be listed before pixel locations (e.g., ($c_2$, $x_{1,1}$)). Furthermore, an asterisk may be used herein to refer to whole rows or columns in a matrix. For example, may refer to the i-th row of matrix A, $b_{*,j}$ may refer to the j-th column of matrix B, and so forth.

In some examples, a "convolution" or "convolution operation" may include an operation during which a filter (e.g., filter 402) may be virtually "placed" at a set of locations within the activation volume, and an output value may be determined for each location based on the weight values included in the filter and the pixel values that may correlate with the location of the filter. For example, at each location, element-wise products for the filter and activation volume may be calculated and summed, thereby producing an output value for the location. A 2-dimensional set of output values produced by convolving a filter and an activation volume may be referred to as a "feature map," an "activation map," an "output activation," or an "output activation value" for the filter.

In some examples, the set of locations within an activation volume that a filter may be placed during a convolution operation may be governed by a "stride" or "stride length" of the filter, which may indicate a number of pixels between each location. For example, a stride of one may indicate that the filter may be moved one pixel at a time across the input volume, with a convolution operation being executed at each location. As another example, a stride of two may indicate that the filter is moved two pixels at a time across the input volume. Hence, in some embodiments, one or more of modules 102 (e.g., maintaining module 104, directing module 108, directing module 108, directing module 108, etc.) may select activation vectors and/or filter matrices for the systems and methods described herein based on a predetermined stride length associated with a filter and/or a convolutional layer of an ANN.

By way of illustration, FIG. 4 includes an output table 406 that includes calculations corresponding to a pass of filter 402 across the W dimension of activation volume 404 with a stride of one pixel. As shown, to determine output values for a first row of activation volume 404 and filter 402 (e.g., values $O_{1,1}$ to $O_{1,8}$), filter 402 may be virtually placed at a set of locations within activation volume 404. At each location, an element-wise multiplication may be performed between the weight values included in filter 402 and a portion of activation volume 404 that corresponds to the location of filter 402. These partial products may then be summed to determine an output value corresponding to the location of filter 402 (e.g., values $O_{1,1}$ to $O_{1,8}$).

For example, when filter 402 is at location 408, output value $O_{1,1}$ may be a sum of nine values corresponding to the weight values included in filter 402: $w_{1,1} \times x_{1,1}$, $w_{1,2} \times x_{1,2}$, $w_{1,3} \times x_{1,3}$, $w_{2,1} \times x_{2,1}$, $w_{2,2} \times x_{2,2}$, $w_{2,3} \times x_{2,3}$, $w_{3,1} \times x_{3,1}$, $w_{3,2} \times x_{3,2}$, and $w_{3,3} \times x_{3,3}$. Furthermore, in examples where a filter and a corresponding activation volume include a plurality of channels, output values for each channel may be summed to determine a final output value. For example, if an output value of a particular location is {10, 20, 5}, in a red channel, green channel, and blue channel, respectively, an overall output value for the particular location (e.g., $O_{i,j}$) may be 10+20+5=35.

As shown in FIG. 4, a row 410 of constituent values of each of output values $O_{1,1}$ through $O_{1,8}$ in output table 406 is highlighted. Row 410 may indicate a set of calculations that share a common factor of $w_{1,1}$, as will be described in greater detail below.

In some examples, a "filter vector" may include a vector that includes a set of weight values corresponding to a location within a filter and to a set of channels associated with the filter. For example, a filter vector that corresponds to weight values associated with a first row and a first column of a filter having a channel depth of eight channels may be denoted by ($w_{1,1}$, $c_{1-8}$). Likewise, in a set of filters, a filter vector that corresponds to weight values associated with a first row and a first column of a first filter having a channel depth of eight channels may be denoted by ($K_1$, $w_{1,1}$, $c_{1-8}$).

In some examples, a "filter matrix" may include a set of filter vectors that each correspond to a filter location (e.g., one of $w_{1,1}$, $w_{1,2}$, $w_{1,3}$, ... $w_{R,S}$) included in a set of filters (e.g., filters $K_1$ through $K_m$). Each filter vector may include a set of weight values that each correspond to a different channel included in a set of channels associated with a filter included in the set of filters. The set of filter vectors may include up to a multiplier matrix width dimension (e.g., m) of filter vectors. Each filter vector may include a predetermined number of channel values that is at most a multiplier matrix height dimension (e.g., k).

Figure 5:

To illustrate, FIG. 5 is a view 500 that shows a filter matrix 502 with m rows and k columns. As shown, each row of filter matrix 502 may include a filter vector corresponding to a filter location $w_{1,1}$ included in each filter K included in a set of m filters. Furthermore, each filter vector in filter matrix 502 may include k weight values corresponding to each channel c included in each filter $K_1$ to $K_m$. For example, a weight value included in a first row and first column of filter matrix 502 may correspond to a filter $K_1$, a filter location $w_{1,1}$, and a channel $c_1$. Likewise, a weight value included in a last row and a last column of filter matrix 204 may correspond to a filter $K_m$, the filter location $w_{1,1}$, and a channel $c_k$.

In some examples, an "activation matrix" may include a set of activation vectors. Each activation vector may correspond to a location within an activation volume (e.g., $x_{1,1}$, $x_{1,2}$, $x_{1,3}$, ... $x_{H,W}$) and may include a set of pixel values corresponding to a set of channels included in the activation volume. For example, an activation vector that corresponds to a location $x_{1,1}$ within an activation volume that includes up to eight channels may be expressed as ($x_{1,1}$, $c_{1-8}$). In some examples, a total number of activation vectors included in an activation matrix may be at most the multiplicand matrix width dimension (e.g., n). Likewise, in some examples, each activation vector included in an activation matrix may include at most the multiplicand matrix width dimension (e.g., k) of activation channel values.

As an illustration, FIG. 5 also includes an activation matrix 504 with n rows and k columns. As shown, each column of activation matrix 504 may correspond to an activation vector that may include a set of k activation channel values $c_1$ to $c_k$ corresponding to a location (e.g., $x_{i,j}$) included in an activation volume. For example, an activation channel value (e.g., a pixel value) included in a first row and first column of activation matrix 504 may correspond to a first channel $c_1$ and a location $x_{1,1}$ of an activation volume. Likewise, an activation channel value included in a last row and a last column of activation matrix 504 may correspond to a channel $c_k$ and a location of $x_n$ (e.g., an n-th member of ($x_{1,1}$, $x_{1,2}$, $x_{1,3}$, ... $x_{H,W}$)) within an activation volume.

Maintaining module 104 may cause computing device 202 to maintain filter matrix 204 in filter cache 206 and activation vectors 208 in activation cache 210 in a variety of contexts. For example, in at least some embodiments, maintaining module 104 may maintain filter matrix 204 in filter cache 206 by loading filter matrix 204 from filter matrices 152 into filter cache 206. In some embodiments, maintaining module 104 may maintain activation vectors 208 in activation cache 210 by loading each activation vector included in activation vectors 208 from activation volume 154 into activation cache 210.

In some examples, one or more of modules 102 (e.g., maintaining module 104, directing module 108, etc.) may further load filter matrix 204 from filter cache 206 into a set of multiplier registers associated with MMU 144 such as multiplier registers 212. Additionally, one or more of modules 102 may further load one or more of activation vectors 208 into a set of multiplicand registers associated with MMU 144 such as multiplicand registers 214.

In some examples, a "multiplier register" may include one or more memory registers included in LMD 142 that may store and/or maintain data that MMU 144 may utilize as a multiplier matrix (e.g., multiplier registers 212) in an MMO. Likewise, a "multiplicand register" may include one or more registers included in LMD 142 that may store and/or maintain data that MMU 144 may utilize as a multiplicand matrix (e.g., multiplicand registers 214) in an MMO.

By way of example, FIG. 4 includes an illustration of multiplier registers 212 that may be storing and/or maintaining filter matrix 204. In this example, MMU 144 may be configured to execute MMOs in a form of 8×8×8. Hence, filter matrix 204 may include eight filter vectors, each filter vector corresponding to a filter location (e.g., $w_{1,1}$) included in each filter included in a set of eight filters (e.g., K1 through $K_8$).

Additionally, FIG. 4 also shows an illustration of multiplicand registers 214 that may be storing and/or maintaining an activation matrix 412 included in activation matrices 208. In this example, where MMU 144 may be configured to execute MMOs in a form of 8×8×8, activation matrix 412 may include eight activation vectors, each activation vector including eight activation channel values corresponding to eight different channels (e.g., $x_{1,1}$, $c_{1-8}$ to $x_{1,8}$, $c_{1-8}$).

Returning to FIG. 3, at step 320, one or more of the systems described herein may determine that the active region of the activation volume is contiguous with a padding region associated with at least a portion of the activation volume. For example, determining module 106 may, as part of computing device 202, determine that the active region of activation volume 154 is contiguous with a padding region associated with at least a portion of activation volume 154.

Determining module 106 may determine that the active region of activation volume 154 (e.g., activation vectors 208) is continuous with a padding region associated with at least a portion of activation volume 154 in a variety of contexts. For example, determining module 106 may access padding data 156 which may include information that indicates that activation vectors 208 are at least partially contiguous with a padding region. Based on padding data 156, determining module 108 may determine that activation vectors 208 are at least partially contiguous with a padding region.

In some examples, the padding region may be associated with and/or determined based on a filter associated with the convolutional layer of the ANN. Various examples, illustrations, and explanations of padding regions associated with activation volumes will be provided below in reference to FIGS. 13 and 14.

Returning to FIG. 3, at step 320, one or more of the systems described herein may direct an MMU included in the hardware accelerator to execute an MMO using the filter matrix and an activation matrix that may include (1) the set of activation vectors, and (2) at least one padding vector corresponding to the padding region. For example, directing module 108 may, as part of computing device 202, cause computing device 202 to direct MMU 144 included in hardware accelerator 140 to execute an MMO using filter matrix 204 and an activation matrix including (1) set of activation vectors 208, and (2) padding vector 216 that may correspond to a padding region associated with activation volume 154.

Directing module 108 may cause computing device 202 to direct MMU 144 to execute an MMO using filter matrix 204 and an activation matrix including activation vectors 208 and padding vector 216 in a variety of ways. In some examples, directing module 108 may direct MMU 144 to generate a primary result matrix by directing MMU 144 to execute the MMO using filter matrix 144 as a multiplier matrix and an activation matrix that includes activation vectors 208 and padding vector 212 as a multiplicand matrix. For example, as noted above, MMU 144 may be configured to perform a an MMO (e.g., a GEMM) using a multiplier matrix having dimensions of m×k and a multiplicand matrix having dimensions of n×k. Hence, in some examples, directing module 108 may cause computing device 202 to generate a primary result matrix (e.g., primary result matrix 220) by directing MMU 144 to execute an MMO (e.g., a GEMM) using filter matrix 204 as a multiplier matrix having dimensions of m×k and an activation matrix that includes activation vectors 208 and padding vector 212 as a multiplicand matrix having dimensions of n×k. In some examples, hardware accelerator 140 may include a set of output activation registers 218 and directing module 108 may store the primary result matrix within output activation registers 218.

In some examples, a "generalized matrix multiplication operation" may include any matrix operation whereby a multiplier matrix is multiplied by a multiplicand matrix to produce a matrix product (also referred to as a result matrix herein, such as a primary result matrix 220, a secondary result matrix 224, etc.). As further shown in FIG. 5, filter matrix 502 may be a multiplier matrix A having dimensions of m×k and activation matrix 504 may be a multiplicand matrix B having dimensions of n×k. A matrix product AB=C may be a matrix 506 having dimensions of m×n such that element $c_{i,j}$ may be obtained by multiplying, term-by-term, the entries of the i-th row of A and the j-th column of B and summing these partial products. In other words, element $c_{i,j}$ of matrix C may be a dot product of the i-th row of A and the j-th column of B. A dot product of two vectors a and b may be expressed as:

$$a \cdot b = \sum_{i=1}^{n} a_i b_i = a_1 b_1 + a_2 b_2 + \ldots + a_n b_n,$$

where Σ denotes summation and n is the dimension of the vector space.

Hence, as shown in FIG. 5, an element within the first row and first column of output matrix C may be a dot product of elements included in a first row (e.g., $a_{1,*}$) of filter matrix 502 and elements included in a first column (e.g., $b_{*,1}$) of activation matrix 504. Likewise, an element within the first row and second column of output matrix C may be a dot product of elements included in a first row $a_{1,*}$ of filter matrix 502 and elements included in a second column $b_{*,1}$ of activation matrix 504. Furthermore, an element within an m-th row and an n-th column of output matrix C may be a dot product of elements included in an m-th row $a_{m,*}$ of filter matrix 502 and elements included in an n-th column $b_{*,n}$ of activation matrix 504.

MMU 144 may execute an MMO, using a filter matrix (e.g., filter matrix 204, filter matrix 502, etc.) as a multiplier matrix and an activation matrix (e.g., activation matrix 504) as a multiplicand matrix in any suitable way. For example, returning to FIG. 4, during each cycle associated with hardware accelerator 140, MMU 144, and/or computing device 202, MMU 144 may access a set of registers included in multiplicand registers 214 that may include a row of a multiplicand matrix. During the cycle, MMU 144 may then determine (e.g., calculate), for each column of values included in the multiplier matrix, a dot product of the row of the multiplicand matrix and the column of values included in the multiplier matrix. This may be referred to as "broadcasting" a pixel (e.g., a location $x_n$ having k channels) of the activation matrix to each of the filter vectors included in the filter matrix.

This operation may be visualized as a convolution operation whereby a 1×1×k portion of an activation volume (e.g., activation volume 154, activation volume 404, etc.) is convolved with a 1×1×k portion of each filter included in a set of m filters.

To illustrate, in some examples, MMU 144 may be configured to execute GEMM operations in the form of m×k×n, where m=8, k=8, and n=8. Thus, MMU 144 may be configured to execute a GEMM using a multiplier matrix having a dimensionality of m×k such that m=8 and k=8. MMU 144 may be further configured to execute the GEMM MMO using a multiplicand matrix having a dimensionality of k×n such that k=8 and n=8. In some examples, MMU 144 may be referred to as \"a matrix multiplication block of $8×8×8$\" or \"an 8×8×8 matrix multiplication block\". Note that these are examples and illustrations only, as MMU 144 may be configured to execute MMOs of any dimensionality including, without limitation, 8×8×8, 16×16×16, 32×32×32, 64×64×64, 8×16×8, 8×32×8, 16×32×16, and so forth.

FIG. 4 also shows an example of multiplier registers 212 and multiplicand registers 214. Although not shown in FIG. 4, in the example illustrated by FIG. 4, MMU 144 may include an 8×8×8 matrix multiplication block. Multiplier registers 212 may be loaded with filter matrix 204 that may include eight filter vectors, with each filter vector corresponding to one of eight filters (e.g., $K_1$ to $K_8$) and a filter location included in each of the eight filters (e.g., $w_{1,1}$). Each filter vector may include eight filter channel values (e.g., $c_1$ to $c_8$) corresponding to the filter location (e.g., $w_{1,1}$). Each row m of filter matrix 204 may correspond to a different filter (e.g., one of $K_1$ to $K_8$), and each column k of filter matrix 204 may correspond to a different filter channel (e.g., $c_1$ to $c_8$) associated with a filter location included in each filter (e.g., $w_{1,1}$).

Likewise, as further shown in FIG. 4, multiplicand registers 214 may be loaded with an activation matrix 412. The activation matrix 412 may include a total of eight activation vectors, with each activation vector corresponding to either (a) a location within activation volume 404 (e.g., $x_{1,1}$, $x_{1,2}$, etc.), or (b) an activation vector that includes padding values (e.g., padding vector 216). Each activation vector may include eight activation channel values (e.g., $c_1$ to $c_8$) corresponding to a location within activation volume 404. As shown, each row k of an activation matrix may correspond to a different activation channel (e.g., $c_1$ to $c_8$) and each column n may correspond to either (a) a different location within activation volume 404 (e.g., $x_{1,1}$, $x_{1,2}$, etc.), or (b) a padding vector (e.g., padding vector 212).

Thus, MMU 144 may use filter matrix 204 as a multiplier matrix and an activation matrix including activation vectors 208 and padding vector 212 as a multiplicand matrix. Each row of the filter matrix 204 may include a filter vector, and each column of the activation matrix may include an activation vector.

In some examples, hardware accelerator 140 and/or one or more components of hardware accelerator 140 may operate in accordance with a clock or clock cycles. During each cycle, directing module 108 may direct MMU 144 to select and/or access a set of registers included in multiplicand registers 214 that may include and/or represent a column of a multiplicand matrix (e.g., an activation vector included in an activation matrix). During the cycle, directing module 108 may further direct MMU 144 to determine (e.g., calculate), for each row of values included in a multiplier matrix (e.g., for each filter vector included in filter matrix 204), a dot product of the column of the activation matrix and each row of values included in filter matrix 204. This may be referred to as "broadcasting" an activation vector (e.g., a pixel value associated with a location $x_{i,j}$ and having up to k channels) of an activation matrix to each of the filter vectors (e.g., weight values associated with a location in each of a set of filters) in filter matrix 204. This may be visualized as a convolution operation whereby a 1×1×k portion of an activation volume (e.g., activation volume 154, activation volume 404, etc.) is convolved with a 1×1×k portion of each filter included in a set of m filters.

Figure 6:
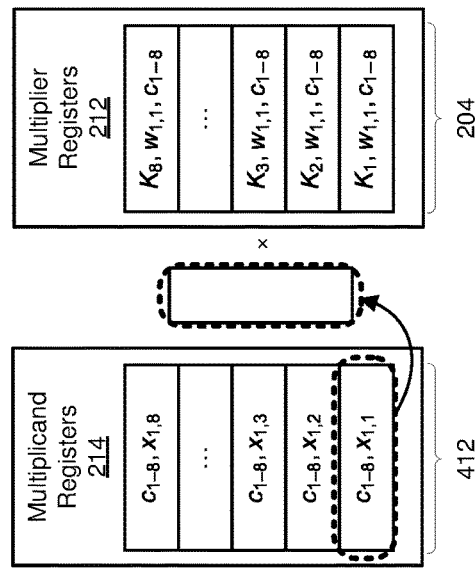
FIGS. 6-13 illustrate determining, via an MMU included in a hardware accelerator, a set of output activation values for a convolutional layer of an artificial neural network using a set of filter matrices and an activation volume as described herein.

FIG. 6 shows a view 600 of a completed first cycle of an MMO executed by an MMU 144. In this example, MMU 144 may include an 8×8×8 matrix multiplication block. As shown, maintaining module 104 may have retrieved filter matrix 204 and an activation matrix that includes activation vectors 208 into multiplier registers 212 and multiplicand registers 214, respectively.

As noted above, in some examples, one or more of modules 102 may select activation matrix 412 based on a predetermined stride length associated with a convolutional layer of an ANN. In the examples illustrated herein, the stride length may be 1. This is by way of example only, and the systems and methods described herein may use or employ any suitable horizontal and/or vertical stride length.

As shown in FIG. 6, directing module 108 may select and/or access an activation vector included in activation matrix 208: ($c_{1-8}$, $x_{1,1}$). The selected and/or accessed activation vector may be included as a column of an activation matrix such as activation matrix 412. The selected and/or accessed activation vector may further have eight channel values $c_1$ to $c_8$ associated with a location $x_{1,1}$. Directing module 108 may cause (e.g., direct) MMU 144, as part of an MMO, to "broadcast" these pixel values to each of eight filter vectors included in filter matrix 204 (e.g., $K_1$, $w_{1,1}$, $c_{1-8}$ to $K_8$, $w_{1,1}$, $c_{1-8}$). This may include determining, for each filter vector included in filter matrix 204, a dot product of the activation vector and the filter vector. For example, directing module 108 may direct MMU 144 to determine, as part of the MMO, a dot product including $K_1$, $w_{1,1}$, $c_{1-8} \cdot c_{1-8}$, $x_{1,1}$. Directing module 108 may further direct one or more components of hardware accelerator 140 (e.g., LMD 142, MMU 144, etc.) to store the result of the dot product operation as part of a primary result matrix (e.g., a primary result matrix 220) within output activation registers 218.

At a conclusion of the first cycle illustrated in FIG. 6, directing module 108 may have directed and/or caused MMU 144 (and/or any other component of hardware accelerator 140) to determine, and store as part of primary result matrix 220 within output activation registers 218, a total of eight dot products involving activation vector $c_{1-8}$, $x_{1,1}$ each of the filter vectors included in filter matrix 204 (e.g., each of $K_1$, $w_{1,1}$, $c_{1-8}$ to $K_8$, $w_{1,1}$, $c_{1-8}$). These dot products may be indicated by the first column of primary result matrix 220 in FIG. 6.

Figure 7:
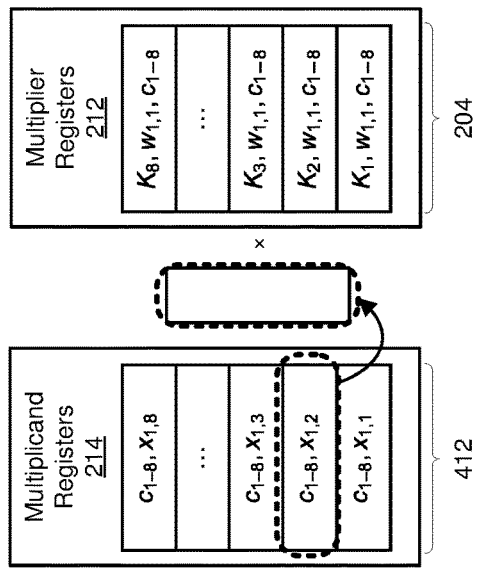

FIG. 7 shows a view 700 of a completed second cycle of an MMO executed by MMU 144. As shown, directing module 108 may have selected and/or accessed an additional activation vector included in activation matrix 412 (e.g., $c_{1-8}$, $x_{1,2}$), and may have caused MMU 144, as part of the continued MMO, to broadcast these pixel values to each of the eight filters included in filter matrix 204 (e.g., $K_1$, $w_{1,1}$, $c_{1-8}$ to $K_8$, $w_{1,1}$, $c_{1-8}$). This may have included determining, for each filter vector included in filter vector 204, a dot product of the activation vector and the filter vector. For example, directing module 108 may have directed MMU 144 to determine, as part of the MMO, a dot product including $K_1$, $w_{1,1}$, $c_{1-8} \cdot c_{1-8}$, $x_{1,2}$. Directing module 108 may further direct hardware accelerator 140 and/or MMU 144 to store the result of the dot product operation as part of primary result matrix 220 within output activation registers 218.

As further shown in FIG. 7, during the second cycle, directing module 108 may further direct MMU 144 to determine, as part of the continued MMO, dot products of the additional activation vectors and the filter vectors included in filter matrix 204. Directing module 108 may further, during the second cycle, cause (e.g., direct) hardware accelerator 140 (e.g., LMD 142, MMU 144, etc.) to store the results of the dot product operations as part of primary result matrix 220 within output activation registers 218. Overall, at a conclusion of the second cycle illustrated in FIG. 7, directing module 108 may have caused (e.g., directed) MMU 144 and/or hardware accelerator 140 to determine, and store as part of primary result matrix 220 within output activation registers 218, a total of eight dot products involving activation vector $c_{1-8}$, $x_{1,2}$ and each of the filter vectors included in filter matrix 204 (e.g., each of $K_1$, $w_{1,1}$, $c_{1-8}$ to $K_8$, $w_{1,1}$, $c_{1-8}$). These eight dot products may be indicated by the second column of primary result matrix 220 in FIG. 7.

MMU 144 may continue the MMO in this fashion until MMU 144 has broadcast all activation vectors included in activation matrix 412 to all the filter vectors included in filter matrix 204. This may result in a result matrix (e.g., primary result matrix 220) having m rows, each row corresponding to a convolution of a 1×1×k portion of each of m filters with each of n 1×1×k locations included in an activation volume, where k represents a channel depth of the filters and activation volume.

Figure 8:
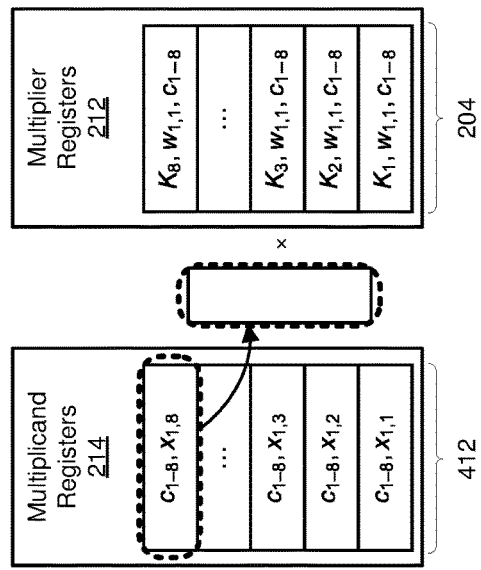

FIG. 8 shows a view 800 of a completed eighth cycle of an MMO executed by an MMU 144. As shown, directing module 108 may direct MMU 144 and/or hardware accelerator 140 to continue the MMO to an eighth cycle, selecting new activation vectors from activation matrix 412 until all activation vectors (e.g., $c_{1-8}$, $x_{1,1}$ to $c_{1-8}$, $x_{1,8}$) have been broadcast to all filter vectors included in filter matrix 204 (e.g., $K_1$, $w_{1,1}$, $c_{1-8}$ to $K_8$, $w_{1,1}$, $c_{1-8}$). This may result in primary result matrix 220 including eight rows, each row corresponding to a convolution of a 1×1×k portion of each of eight filters (e.g., $K_1$ to $K_8$) with each of 8 1×1×k locations included in an activation volume (e.g., to $c_{1-8}$, $x_{1,1}$ to $c_{1-8}$, $x_{1,8}$), where k represents a common channel depth of the eight filters and the activation volume (e.g., C=8).

Figure 9:
Figure 10:
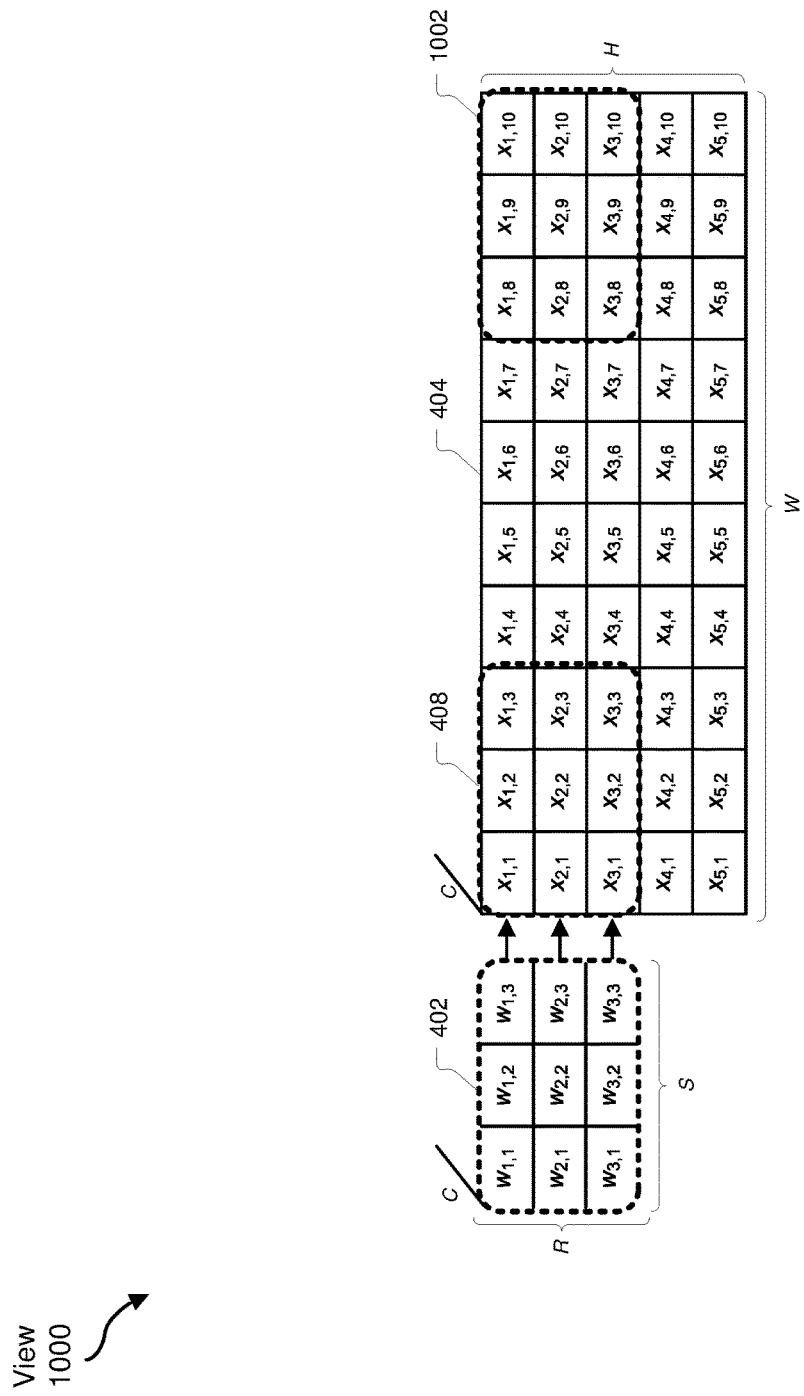

Upon a conclusion of the eighth cycle, output activation registers 218 may include a set of values (e.g., primary result matrix 220) that may correspond to a portion of a set of output values for a set of convolution operations. FIG. 9 shows a view 900 that includes output table 406 with row 410 of constituent or partial values of each of values $O_{1,1}$ through $O_{1,8}$. When compared with primary result matrix 220 in FIG. 8, it may be apparent that primary result matrix 220 may include values corresponding to row 410 for each filter in $K_1$ to $K_8$, up to a channel depth of C=8. In examples where the filters and activation volume may include more than k channels, one or more additional loops and/or executions of MMOs as described herein may be added to determine and accumulate additional output values associated with the additional channels.

As further shown in FIG. 9, partial row 902, a part of a second row of constituent values of each of values $O_{1,1}$ through $O_{1,7}$, includes several values that share common factors (e.g., $x_{1,2}$ to $x_{1,8}$) with entries in row 410. Indeed, apart from entry 904, corresponding to an activation vector associated with location $x_{1,9}$ in activation volume 404, each activation vector included in partial row 902 (e.g., $x_{1,2}$ to $x_{1,8}$) is repeated from row 410. Likewise, partial row 906, apart from entry 908, includes all activation values included in partial row 902 and entry 904. Collectively, these three rows of values may form a first partial product for output values $O_{1,1}$ to $O_{1,8}$, the first partial product corresponding to a first row of filter 402 (e.g. $w_{1,1}$, $w_{1,2}$, and $w_{1,3}$). As will be described in greater detail below, hardware accelerator 140 may reuse the repeated activation vectors that are already loaded into LMD 142 in subsequent MMOs during a convolution operation. This reuse may result in significant power savings over conventional systems and methods that may access and/or retrieve more activation values more often from slower and/or more power-inefficient memory and/or data storage devices while performing convolution operations.

During a convolution operation, some portions of a filter may pass over the same locations within an activation volume as other portions of the filter. To illustrate, FIG. 10 includes a view 1000 of filter 402, activation volume 404, and location 408 from FIG. 4. As shown, when filter 402 is at location 408 (e.g., at the start of a convolution operation), weight value $w_{1,1}$ is positioned over activation volume location $x_{1,1}$ and weight value $w_{1,2}$ is positioned over activation volume location $x_{1,2}$. Likewise, when filter 402 is at location 1002, weight value $w_{1,1}$ is positioned over activation volume location $x_{1,8}$ and weight value $w_{1,2}$ is positioned over activation volume location $x_{1,9}$.

During a convolution operation, filter 402 may be conceptually moved across activation volume 404 one location at a time (e.g., in accordance with a stride of 1). Weight value $w_{1,1}$ may pass over locations $x_{1,1}$ to $x_{1,8}$, and weight value $w_{1,2}$ may pass over locations $x_{1,2}$ to $x_{1,9}$. In this example, the two weight values may share seven of the same activation locations within activation volume 404 (e.g., $x_{1,2}$ to $x_{1,8}$) during a convolution operation. As will be described in greater detail below, the systems and methods described herein may reuse these shared values in multiple convolution operations involving multiple filters to conserve power that may otherwise be used to access and/or transfer activation values from power-inefficient storage and/or memory devices.

However, some portions of a filter may pass over different locations within an activation volume during a convolution operation. For example, weight value $w_{1,1}$ and weight value $w_{1,2}$ may pass over eight the same activation locations during a convolution operation involving a top row of activation volume 404. However, weight value $w_{1,1}$ may never pass over or intersect with activation location $x_{1,9}$, and weight value $w_{1,2}$ may never pass over or intersect with activation location $x_{1,1}$.

Hence, in order to continue with the convolution operation, and to maximize reuse of filter and/or activation values, one or more of modules 102 (e.g., maintaining module 104, determining module 106, directing module 108, etc.) may cause computing device 202 to load an additional filter matrix (e.g., additional filter matrix 222) into filter cache 206 and/or multiplier registers 212. In at least some embodiments, additional filter matrix 222 may replace filter matrix 204 within filter cache 206. In additional embodiments, filter cache 206 may be sized to accommodate a plurality of filter matrices (e.g., both filter matrix 204 and additional filter matrix 222). In some examples, one or more of modules 102 may also load an additional activation vector (e.g., an activation vector that may correspond to activation location $x_{1,9}$) included activation volume 154 into activation cache 210 and/or multiplicand registers 214. This may be accomplished through a simple, efficient line read operation, and may not require complex muxing mechanisms of conventional solutions.

As will be described in greater detail below, one or more of modules 102 (e.g., directing module 108) may then cause MMU 144 to execute an additional MMO using additional filter matrix 222 (e.g., corresponding to weight values $w_{1,2}$) and activation matrix 412, reusing the activation vectors corresponding to activation locations shared by the two filter locations. This may result in a power-efficient production of further partial output values corresponding to partial row 902 and entry 904 and/or partial row 906 and entry 908.

Additional filter matrix 222 may include any filter matrix that may correspond to a different location within filters $K_1$ to $K_m$ than filter matrix 204. In some examples, additional filter matrix 222 may correspond to a location within filters $K_1$ to $K_m$ that adjoins a location within filters $K_1$ to $K_m$ corresponding to filter matrix 204. For example, when filter matrix 204 corresponds to a location $w_{1,1}$ within filters $K_1$ to $K_m$, additional filter matrix 222 may correspond to a location $w_{1,2}$ within filters $K_1$ to $K_m$.

Directing module 108 may cause computing device 202 to load additional filter matrix 222 corresponding to a secondary filter location into filter cache 206 in a variety of contexts. For example, directing module 108 may access filter matrices 152 in data store 150 and may identify additional filter matrix 222. Likewise, directing module 108 may access activation volume 154 in data store 150 and may identify additional activation vectors that may be included in a row of activation volume 154. Directing module 108 may then cause computing device 202 to transfer, via a suitable data path (e.g., a data bus that may communicatively couple LMD 142 and data store 150), additional filter matrix 222 into filter cache 206 and/or multiplier registers 212 and one or more additional activation vectors into activation cache 210 and/or multiplicand registers 214. In some examples, additional filter matrix 222 may replace filter matrix 204 within filter cache 206 and/or multiplier registers 212. In additional or alternative examples, filter cache 206 may be sized to maintain (e.g., simultaneously maintain) both filter matrix 204 and additional filter matrix 222.

As mentioned above, loading of additional activation vectors into activation cache 210 and/or multiplicand registers 214 may be accomplished via a simple line read of additional activation vectors from activation volume 154, which may be far more power-efficient than complex memory management and/or muxing schemes employed by conventional convolution solutions. In some examples, one or more of modules 102 (e.g., maintaining module 104, determining module 106, directing module 108, etc.) may arrange, within data store 150, values included in activation volume 154 such that directing module 108 may access and/or transfer additional activation vectors via a line read of a portion of data store 150.

Directing module 108 may also direct MMU 144 to execute an additional MMO using additional filter matrix 222 and activation matrix 412. Directing module 108 may direct MMU 144 to execute the additional MMO in a variety of contexts. For example, directing module 108 may execute the additional MMO by (1) producing a secondary result matrix by directing the MMU to execute the MMO using additional filter matrix 222 as the multiplier matrix and activation matrix 412 as the multiplicand matrix, (2) accumulating the secondary result matrix and the primary result matrix, and storing a result of accumulating the secondary result matrix and the primary result matrix within the set of output activation registers.

Figure 11:
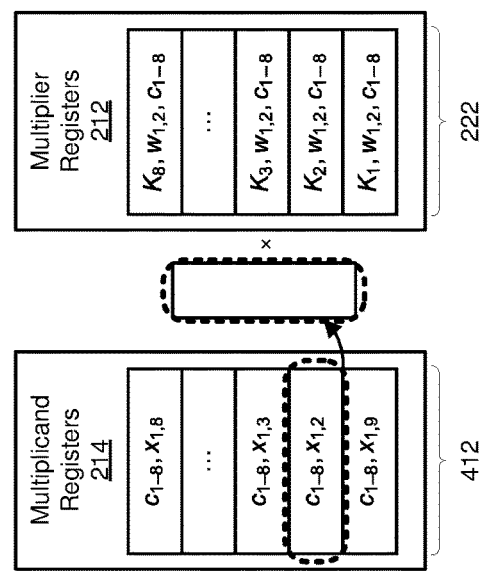

By way of illustration, FIG. 11 shows a view 1100 of a ninth cycle associated with hardware accelerator 140, MMU 144, and/or computing device 202 continuing from the eighth cycle illustrated by FIG. 8. As shown, directing module 108 has replaced filter matrix 204 within multiplier registers 212 with additional filter matrix 222. Directing module 108 has also replaced activation vector $c_{1,8}$, $x_{1,1}$ with activation vector $c_{1,8}$, $x_{1,9}$. Hence, as shown in FIG. 11, during the ninth cycle, directing module 108 has broadcast the indicated activation vector $c_{1,8}$, $x_{1,2}$ to each of filter vectors $K_{1-8}$, $w_{1,2}$, $C_{1-8}$ included in filters $K_1$ to $K_8$. At a conclusion of the ninth cycle, MMU 144 may have generated dot product values corresponding to activation vector $c_{1-8}$, $x_{1,2}$ and each of the filter vectors included in additional filter matrix 222. These values may correspond to at least a portion of secondary result matrix 224.

Furthermore, as shown in FIG. 11, directing module 108 may further accumulate values included in corresponding locations in secondary result matrix 224 and primary result matrix 220 to form output activation values 226. In some examples, an "output activation" or "output activation value" may include at least part of an output value for a particular location in an activation volume (e.g., activation volume 154, activation volume 404, etc.) that has been convolved with a filter (e.g., filter 402). For example, returning to output table 406 in FIG. 9, output value $O_{1,1}$ may be a sum of an element-wise multiplication of weight values included in filter 402 and activation vectors corresponding to location 408 when the filter is at location 408 (e.g., $w_{1,1} \times x_{1,1}$, $w_{1,2} \times x_{1,2}$, $w_{1,3} \times x_{1,3}$, $w_{2,1} \times x_{2,1}$, $w_{2,2} \times x_{2,2}$, $w_{2,3} \times x_{2,3} + w_{3,1} \times x_{3,1}$, $w_{3,2} \times x_{3,2} + w_{3,3} \times x_{3,3}$). Furthermore, as described above, the systems and methods described herein may determine values for at least row 410, partial row 902, and entry 904. The systems and methods described herein may include these values as part of a primary result matrix (e.g., primary result matrix 220) and a secondary result matrix (e.g., secondary result matrix 224).

Directing module 108 may determine output activation values 226 based on a result of accumulating secondary result matrix 224 and corresponding primary result matrix 220. For example, directing module 108 may determine an output activation value 226 by accumulating secondary result matrix 224 with primary result matrix 220. As noted above, primary result matrix 220 and secondary result matrix 224 may each include partial products for output activations corresponding to a set of filters. Additionally, where a matrix A and a matrix B may have the same dimensions, a sum of matrix A and matrix B may be denoted by A+B, and may be determined by adding corresponding elements of A and B. Hence, corresponding elements in a primary result matrix 220 and a secondary result matrix 224 may be added together to at least partially determine a corresponding output activation value included in output activation values 226.

In some examples, directing module 108 may store secondary result matrix 224 within a set of registers included in LMD 142 that may be distinct from output activation registers 218. Once directing module 108 has produced secondary result matrix 224, directing module 108 may then accumulate (e.g., add) secondary result matrix 224 and a corresponding primary result matrix 220 and store a result of accumulating the secondary result matrix and the primary result matrix within a corresponding set of output activation registers 218.

Figure 12:
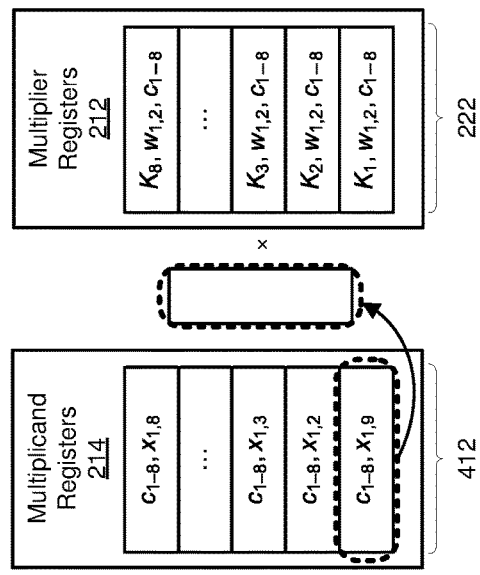

In some embodiments, directing module 108 may accumulate secondary result matrix 224 and primary result matrix 220 in-place within output activation registers 218. For example, as shown in FIGS. 11 and 12, as MMU 144 executes the MMO using additional filter matrix 222 as a multiplier matrix and activation matrix 412 as a multiplicand matrix, directing module 108 may accumulate values of secondary result matrix 224 with values stored in output activation registers 218 that correspond to respective values included in primary result matrix 220. This may conserve limited memory resources within output activation registers 218 while also efficiently and accurately accumulating partial products to at least partially determine output activation values (e.g., output activation values 226) corresponding to the filters and the activation volume.

By way of illustration, FIG. 11 includes a view 1100 that shows output activation registers 218 after directing module 108 has caused MMU 144 to broadcast activation vector $(c_{1-8}, x_{1,2})$ to each filter vector included in additional filter matrix 222. As shown, directing module 108 may accumulate these dot product values with respective dot product values in primary result matrix 220. Such an accumulation may be indicated in FIGS. 11-12 by a "+=" symbol. A "+=" symbol may be included in each cell (e.g., register or set of registers) of output activation registers 218 that includes a dot product value included in the secondary result matrix that has been or may be accumulated with a corresponding dot product value included in the corresponding primary result matrix to form a corresponding output activation value (e.g., an output activation value included in output activation values 226) in output activation registers 218.

For example, as shown in FIG. 8, at a conclusion of the MMO (e.g., the MMO involving filter matrix 204 and activation matrix 412), a set of registers included in output activation registers 218 may include a value corresponding to an eighth column and eighth row in primary result matrix 220. This value may correspond to $(K_1, w_{1,1}, c_{1-8} \cdot c_{1-8}, x_{1,8})$. At the conclusion of the additional MMO (e.g., an MMO involving additional filter matrix 222 and activation matrix 412), as shown in FIG. 12, that set of registers may include a value that corresponds to a value of $(K_1, w_{1,1}, c_{1-8} \cdot c_{1-8}, x_{1,8}) + (K_1, w_{1,2}, c_{1-8} \cdot c_{1-8}, x_{1,9})$.

Hence, directing module 108 may accumulate each value included in secondary result matrix 224 with a corresponding value in primary result matrix 220 in-place within output activation registers 218, and may store a result within output activation registers 218. Thus, at a conclusion of the MMO based on additional filter matrix 222 and activation matrix 412, output activation registers 218 may include output activation values 226.

During cycles subsequent to the ninth cycle illustrated by FIG. 11, directing module 108 may cause MMU 144 to further broadcast at least one of the remaining activation vectors included in activation matrix 412 to each of the filter vectors included in additional filter matrix 222. Thus, after seven cycles of the additional MMO, MMU 144 may have broadcast all the activation vectors included in activation matrix 412 to all the filter vectors included in additional filter matrix 222.

To illustrate, FIG. 12 includes a view 1200 that illustrates a sixteenth cycle associated with hardware accelerator 140, MMU 144, and/or computing device 202. As shown, directing module 108 may have caused MMU 144 to broadcast (e.g., during one or more of a tenth cycle through a fifteenth cycle) each activation vector included in activation matrix 412 to each filter vector included in additional filter matrix 222, thereby producing seven columns of output activation values 226 (e.g., by accumulating values included in secondary result matrix 224 with corresponding values in primary result matrix 220).

Hence, directing module 108 may determine, based on a result of accumulating secondary result matrix 224 and primary result matrix 220, a set of output activation values 226 for the convolutional layer of the ANN.

When convolving a filter having dimensions of R×S with an input volume having dimensions of H×W, an output volume may result with dimensions of (H−R+1)×(W−S+1). For example, when convolving a filter having dimensions of 3×3 with an input volume having dimensions of 8×8, a resulting output volume may have dimensions of 6×6. Thus, the output volume may have smaller dimensions than the input volume. This reduction may place an upper limit on a number of progressive and/or sequential operations may be performed on an input volume, thereby precluding using the input volume in deeper ANNs. Additionally, activation vectors (e.g., pixels) on an edge of an input volume (e.g., an image) may be involved in fewer convolution operations than interior activation vectors. Consequently, the information on the borders of input volumes (e.g., images) may not be preserved as well as information in the middle or interior of input volumes.

One possible way of alleviating the foregoing issues may be to add padding regions to input volumes. Padding regions may be regions associated with an input volume that may include predetermined padding values (e.g., zero values, null values, predetermined values, etc.) positioned to allow a convolution operation with a filter and an input volume to produce a particular or predetermined size of output activation values without unduly influencing values included in an active region of the input volume.

Figure 13:
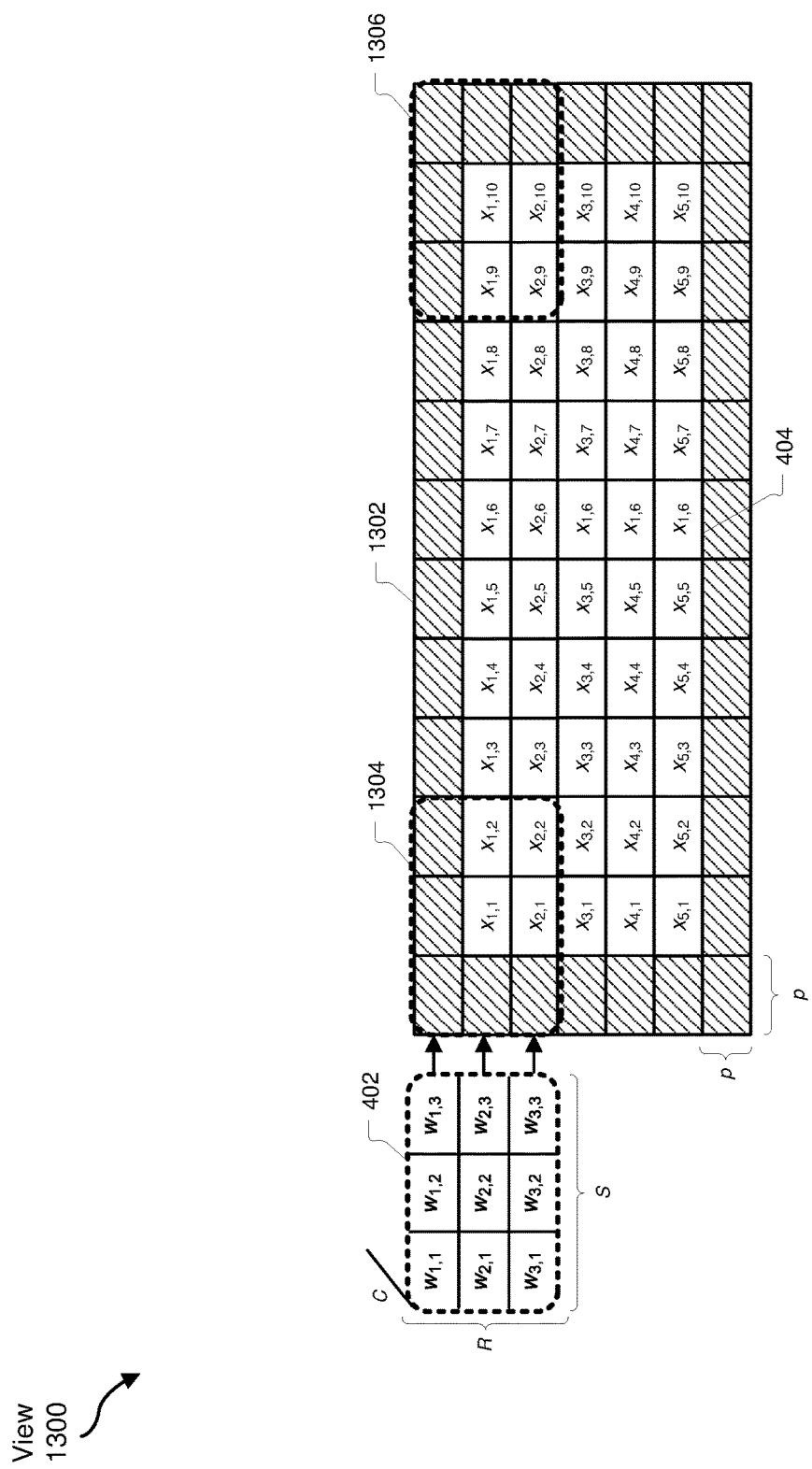

By way of illustration, FIG. 13 shows a view 1300 of filter 402 and activation volume 404. In this view, activation volume 404 is surrounded by padding region 1302. Padding region 1302 may be any suitable number of elements p (e.g., pixels, activation vectors, etc.) wide. In the example illustrated in FIG. 13, p may be one pixel. However, in other examples, p may represent any suitable number of pixels or size of a padding region. The information included in each pixel included in padding region 1302 may be any value that may be suitable as a padding value for performing convolutions. For example, each element included in padding region 1302 may be a null or zero value.

Padding region 1302 may be associated with and/or contiguous with activation volume 404. In some examples, activation vectors included in activation volume 404 may be referred to as an active region of activation volume 404, while padding region 1302 may be referred to as a padding region associated with activation volume 404.

Thus, during a convolution of filter 402 with activation volume 404 and associated padding region 1302, filter 402 may at times partially include portions of padding region 1302 and portions of activation volume 404. For example, when filter 402 is at location 1304, an output value for the convolution (e.g., $O_{1,1}$) may equal $w_{1,1} \times p + w_{1,2} \times p + w_{1,3} \times p + w_{2,1} \times p + w_{2,2} \times x_{1,1} + w_{2,3} \times x_{1,2} + w_{3,1} \times p + w_{3,2} \times x_{2,1} + w_{3,3} \times x_{2,2}$. Furthermore, when filter 402 is at a location 1306, an output value for the convolution (e.g., $O_{1,10}$) may equal $w_{1,1} \times p + w_{1,2} \times p + w_{1,3} \times p + w_{2,1} \times x_{1,9} + w_{2,2} \times x_{1,10} + w_{2,3} \times p + w_{3,1} \times x_{2,9} + w_{3,2} \times x_{2,10} + w_{3,3} \times p$.

Figure 14:
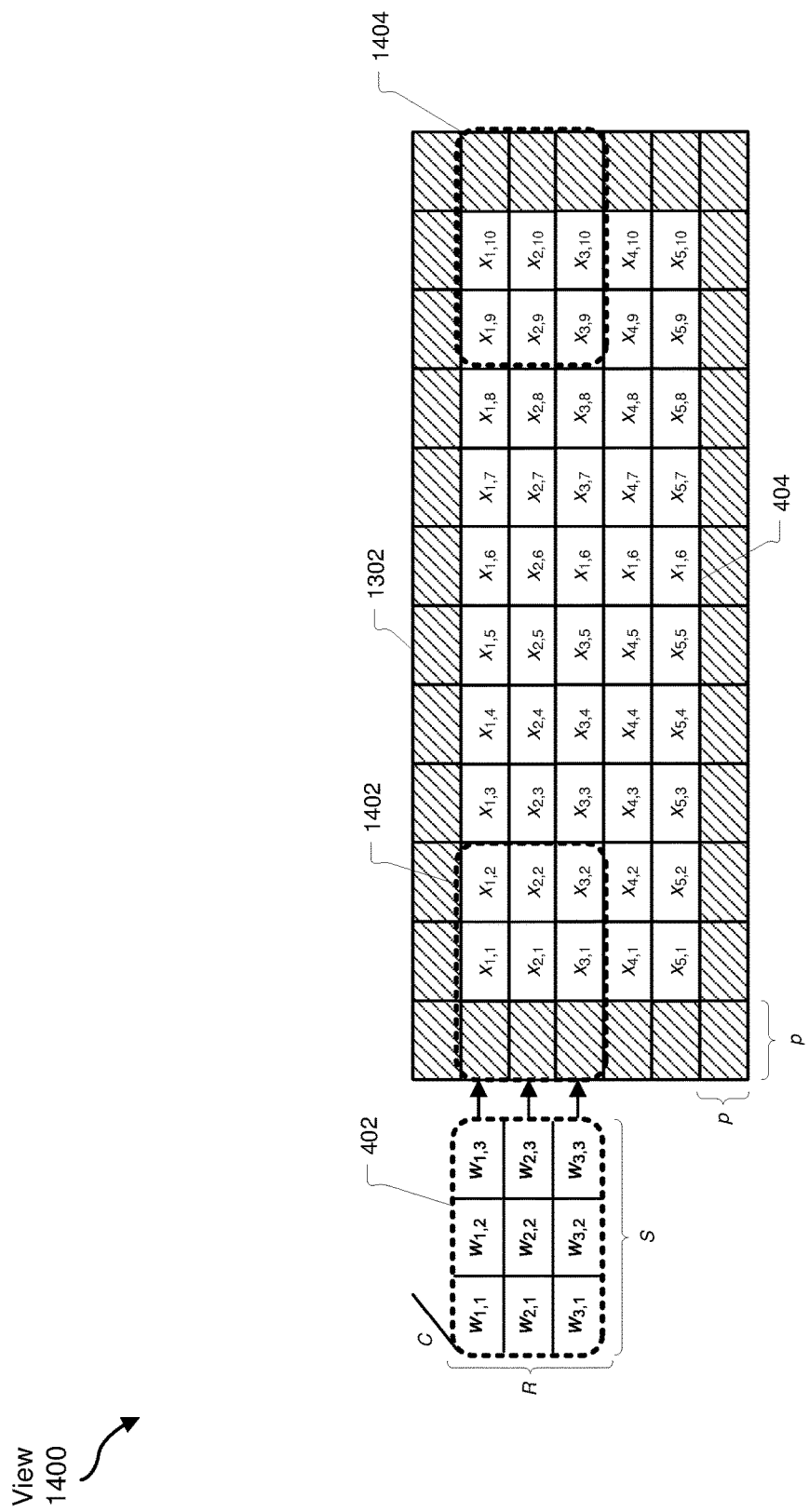
FIGS. 14-15 illustrate padding or halo regions associated with activation volumes as described herein.

Likewise, FIG. 14 shows a view 1400 of filter 402 and activation volume 404. In this view, activation volume 404 is also surrounded by padding region 1302. When filter 402 is at location 1402, an output value for the convolution (e.g., $O_{2,1}$) may equal $w_{1,1} \times p + w_{1,2} \times x_{1,1} + w_{1,3} \times x_{1,2} + w_{2,1} \times p + w_{2,2} \times x_{2,1} + w_{2,3} \times x_{2,2} + w_{3,1} \times p + w_{3,2} \times x_{22} + w_{3,3} \times x_{2,3}$. Furthermore, when filter 402 is at a location 1404, an output value for the convolution (e.g., $O_{2,10}$) may equal $w_{1,1} \times x_{1,9} + w_{1,2} \times x_{1,10} + w_{1,3} \times p + w_{2,1} \times x_{2,9} + w_{2,2} \times x_{2,10} + w_{2,3} \times p + w_{3,1} \times x_{3,9} + w_{3,2} \times x_{3,10} + w_{3,3} \times p$.

Unfortunately, in accordance with the systems and methods described above in reference to FIGS. 6-12, it may be costly in terms of power consumption and/or processing power to add a padding region to an activation volume prior to transferring activation vectors from data store 150 to hardware accelerator 140. For example, adding a padding region for activation volume 154 may require costly arranging of data within data store 150. Additionally, it may be inefficient to transfer padding values along with activation vectors, especially when padding values may be predetermined, null, or zero values. Hence, the systems and methods described herein may reduce power consumption and/or simplify storage and/or memory organization of computing systems that include or utilize hardware accelerators for convolution operations.

As mentioned above, determining module 106 may determine that an active region of an activation volume (e.g., activation vectors included in activation volume 154) may be contiguous with a padding region (e.g., included in padding data 156) associated with at least a portion of the activation volume. Directing module 108 may then direct MMU 144 included in hardware accelerator 140 to execute an MMO using the filter matrix (e.g., filter matrix 204) and an activation matrix that includes (a) activation vectors included in the active region, and (b) at least one padding vector corresponding to the padding region. In some examples, hardware accelerator 140 and/or MMU 144 may generate and/or store the padding vector, and therefore only activation vectors included in the active region may be transferred from data store 150 to hardware accelerator 140. In other examples, directing module 108 may, when a portion of an MMO may involve a padding region, simply not perform the portion of the MMO that involves the padding region, thereby conserving power and computing resources.

Figure 15:
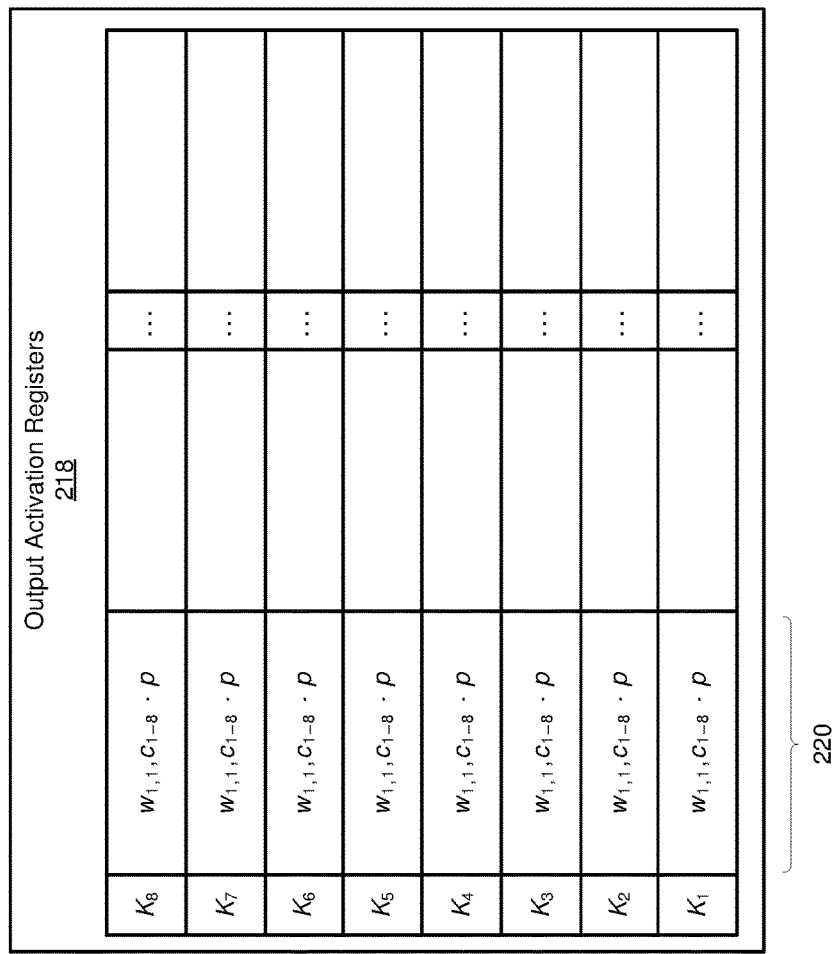
Figure 15:
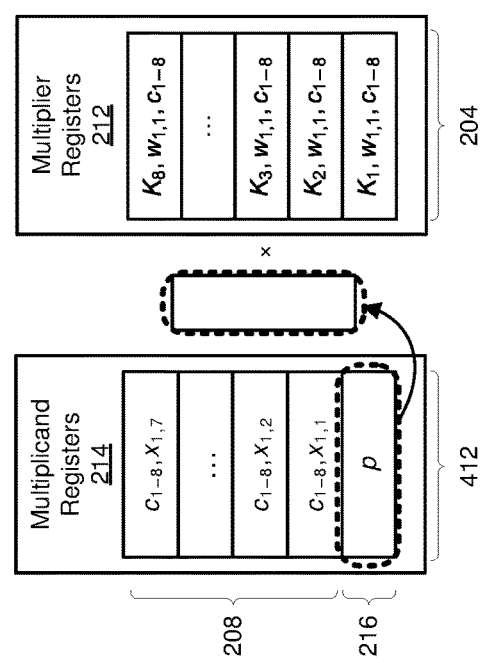

FIG. 15 shows a view 1500 of a completed first cycle of an MMO executed by an MMU 144. In this example, MMU 144 may include an 8×8×8 matrix multiplication block. As shown, maintaining module 104 and/or determining module 108 may have retrieved filter matrix 204 and an activation matrix that includes activation vectors 208 into multiplier registers 212 and multiplicand registers 214, respectively. Additionally, one or more of modules 102 (e.g., maintaining module 104, determining module 106, directing module 108, etc.) may have loaded a padding vector 216 into multiplicand registers 214 as part of the activation matrix.

As shown in FIG. 15, as in the example illustrated by FIG. 6 above, directing module 108 may select and/or access an activation vector included in multiplicand registers 214. However, in this example, the accessed activation vector may be padding vector 216. Directing module 108 may cause (e.g., direct) MMU 144, as part of an MMO, to "broadcast" padding vector p to each of eight filter vectors included in filter matrix 204 (e.g., $K_1$, $w_{1,1}$, $c_{1-8}$ to $K_8$, $w_{1,1}$, $c_{1-8}$). This may include determining, for each filter vector included in filter matrix 204, a dot product of the padding vector and the filter vector. For example, directing module 108 may direct MMU 144 to determine, as part of the MMO, a dot product including $K_1$, $w_{1,1}$, $c_{1-8}\cdot p$. Directing module 108 may further direct one or more components of hardware accelerator 140 (e.g., LMD 142, MMU 144, etc.) to store the result of the dot product operation as part of a primary result matrix (e.g., a primary result matrix 220) within output activation registers 218. These dot products may be indicated by the first column of primary result matrix 220 in FIG. 6.

Additionally or alternatively, in some examples, directing module 108 may direct MMU 144 to skip, ignore, and/or omit a portion of the MMO that may include padding vector 216. In some examples, directing module 108 may additionally or alternatively cause hardware accelerator 140 to write padding values to output activation registers 218 for values corresponding to the portion of primary result matrix 220 that may correspond to a skipped, ignored, and/or omitted portion of the MMO. Thus, although illustrated as dot product results in FIG. 15, the values stored in output activation registers 218 may include or represent padding values written by hardware accelerator 140 and/or MMU 144 as a consequence of a direction from directing module 108 to skip, ignore, and/or omit a portion of the MMO that includes padding vector 216.

Figure 16:
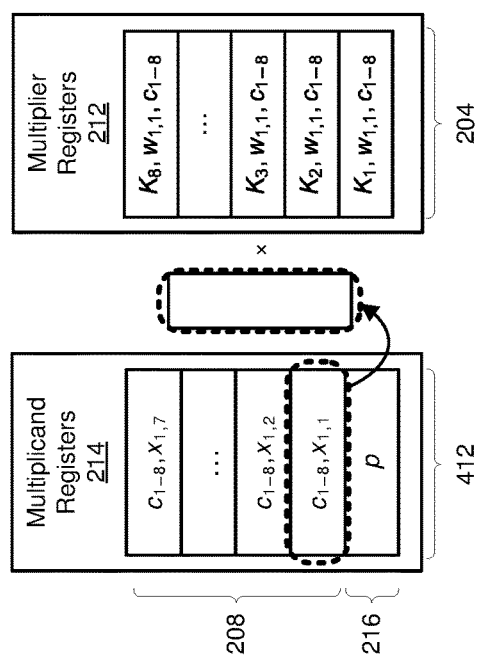
FIGS. 16-19 illustrate directing an MMU included in a hardware accelerator to execute an MMO using a filter matrix and an activation matrix that includes (1) a set of activation vectors, and (2) at least one padding vector corresponding to a padding region as described herein.

FIG. 16 shows a view 1600 of a completed second cycle of an MMO executed by MMU 144. As shown, directing module 108 may have selected and/or accessed an additional activation vector included in activation matrix 412 (e.g., $c_{1-8}$, $x_{1,1}$), and may have caused MMU 144, as part of the continued MMO, to broadcast these pixel values to each of the eight filters included in filter matrix 204 (e.g., $K_1$, $w_{1,1}$, $c_{1-8}$ to $K_8$, $w_{1,1}$, $c_{1-8}$). This may have included determining, for each filter vector included in filter vector 204, a dot product of the activation vector and the filter vector. For example, directing module 108 may have directed MMU 144 to determine, as part of the MMO, a dot product including $K_1$, $w_{1,1}$, $c_{1-8}·c_{1-8}$, $x_{1,1}$. Directing module 108 may further cause (e.g., direct) hardware accelerator 140 and/or MMU 144 to store the result of the dot product operation as part of primary result matrix 220 within output activation registers 218.

As further shown in FIG. 16, during the second cycle, directing module 108 may further direct MMU 144 to determine, as part of the continued MMO, dot products of the additional activation vectors and the filter vectors included in filter matrix 204. Directing module 108 may further, during the second cycle, cause (e.g., direct) hardware accelerator 140 (e.g., LMD 142, MMU 144, etc.) to store the results of the dot product operations as part of primary result matrix 220 within output activation registers 218. Overall, at a conclusion of the second cycle illustrated in FIG. 16, directing module 108 may have caused (e.g., directed) MMU 144 and/or hardware accelerator 140 to determine, and store as part of primary result matrix 220 within output activation registers 218, a total of eight dot products involving activation vector $c_{1-8}$, $x_{1,1}$ and each of the filter vectors included in filter matrix 204 (e.g., each of $K_1$, $w_{1,1}$, $c_{1-8}$ to $K_8$, $w_{1,1}$, $c_{1-8}$). These eight dot products may be indicated by the second column of primary result matrix 220 in FIG. 16.

Figure 17:
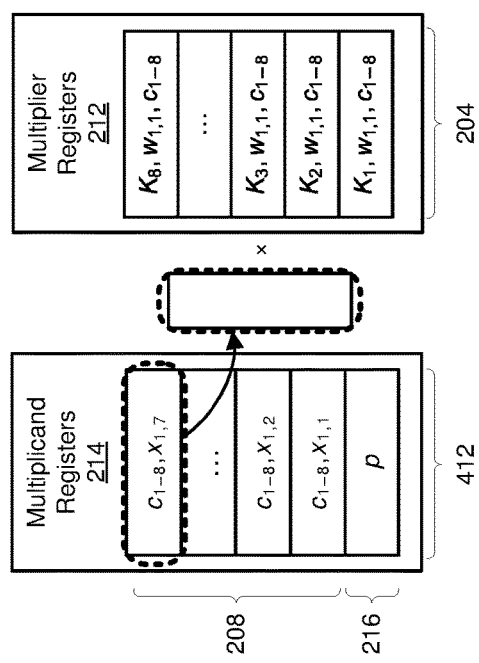

FIG. 17 shows a view 1700 of a completed eighth cycle of an MMO executed by an MMU 144. As shown, directing module 108 may direct MMU 144 and/or hardware accelerator 140 to continue the MMO to an eighth cycle, selecting new activation vectors from activation matrix 412 until all activation vectors (e.g., p to $c_{1-8}$, $x_{1,7}$) have been broadcast to all filter vectors included in filter matrix 204 (e.g., $K_1$, $w_{1,1}$, $c_{1-8}$ to $K_8$, $w_{1,1}$, $c_{1-8}$). This may result in primary result matrix 220 including eight rows, each row corresponding to a convolution of a 1×1×k portion of each of eight filters (e.g., $K_1$ to $K_8$) with each of 8 1×1×k locations included in an activation volume (e.g., to $c_{1-8}$, $x_{1,8}$), where k represents a common channel depth of the eight filters and the activation volume (e.g., C=8).

Figure 18:
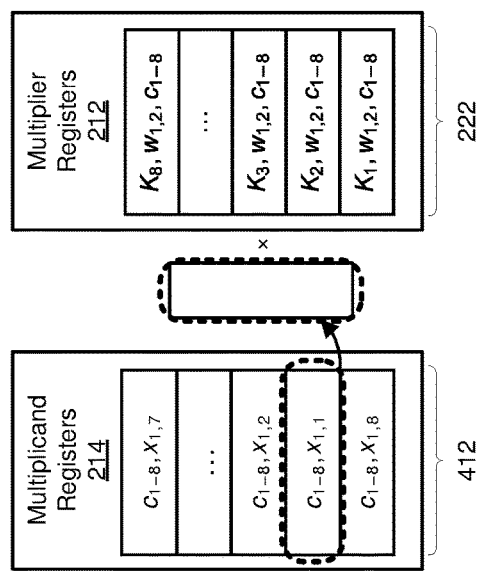

FIG. 18 shows a view 1800 of a ninth cycle associated with hardware accelerator 140, MMU 144, and/or computing device 202 continuing from the eighth cycle illustrated by FIG. 17. As shown, directing module 108 has replaced filter matrix 204 within multiplier registers 212 with additional filter matrix 222. Directing module 108 has also replaced padding vector 216 with activation vector $c_{1-8}$, $x_{1,8}$. Hence, as shown in FIG. 18, during the ninth cycle, directing module 108 has broadcast the indicated activation vector $c_{1-8}$, $x_{1,1}$ to each of filter vectors $K_{1-8}$, $w_{1,2}$, $c_{1-8}$ included in filters $K_1$ to $K_8$. At a conclusion of the ninth cycle, MMU 144 may have generated dot product values corresponding to activation vector $c_{1-8}$, $x_{1,1}$ and each of the filter vectors included in additional filter matrix 222. These values may correspond to at least a portion of secondary result matrix 224. Furthermore, directing module 108 may also accumulate values included in corresponding locations in secondary result matrix 224 and primary result matrix 220 to form output activation values 226.

Figure 19:
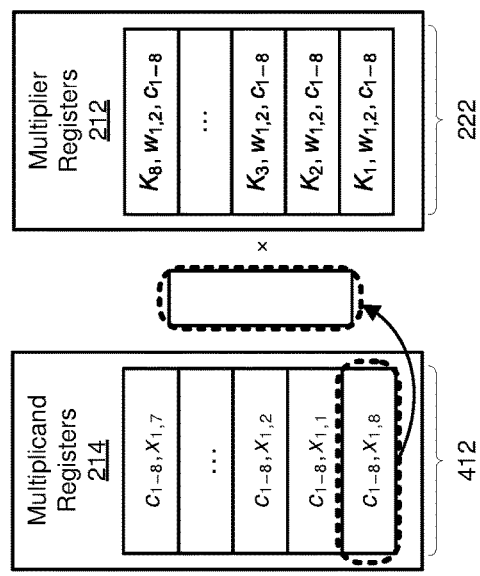

FIG. 19 includes a view 1900 that illustrates a sixteenth cycle associated with hardware accelerator 140, MMU 144, and/or computing device 202. As shown, directing module 108 may have caused MMU 144 to broadcast (e.g., during one or more of a tenth cycle through a fifteenth cycle) each activation vector included in activation matrix 412 to each filter vector included in additional filter matrix 222, thereby producing seven columns of output activation values 226 (e.g., by accumulating values included in secondary result matrix 224 with corresponding values in primary result matrix 220). Modules 102 (e.g., maintaining module 104, determining module 106, and/or directing module 108) may continue in this fashion until they determine all output values (e.g., output values $O1,1$, $O1,2$, $O1,3$, etc.) for activation volume 154 and/or filter matrices 152. Hence, directing module 108 may determine, based on a result of accumulating secondary result matrix 224 and primary result matrix 220, a set of output activation values 226 for the convolutional layer of the ANN.

As discussed throughout the instant disclosure, the systems and methods described herein may provide one or more advantages over traditional options for performing convolution operations for ANNs. For example, traditional and/or conventional systems for performing convolution operations may convert convolutional layers to matrix multiplication blocks by rearranging discrete image blocks to columns, such as via an im2col operation. This may require element-wise steering, necessitating elaborate muxing mechanisms that may consume power and complicate designs of such systems.

Additionally, rearranging image blocks via an im2col operation may result in large matrix sizes, leading to large data transfers between system components (e.g., between a CPU and a GPU, between the CPU and a memory device, between a memory device and a data store, etc.). Such large data transfers may further increase power consumption of such systems. Furthermore, such systems may fail to take advantage of spatial reuse that may be available for convolution operations.

By leveraging spatial reuse that exists in convolution operations, the systems and methods described herein may reduce a number of accesses or reads from power-inefficient data storage devices that may be remote from a hardware accelerator. Also, by maximizing reuse of activation values already retrieved from power-inefficient data storage devices, the systems and methods described herein may favor power efficient memory operations and/or memory devices that may be local to an MMU.

Moreover, the systems and methods described herein may also efficiently handle padding or halo regions of activation volumes by directing the hardware accelerator to handle padding of activation data (e.g., as part of a GEMM and/or as a directive to skip, ignore, and/or omit execution of portions of the GEMM) rather than adding padding in software (e.g., by physical processor 130) prior to transferring the padded activation data to the hardware accelerator. This may further reduce power, data transfer, and/or processor resource usage. Thus, the systems and methods described herein may provide efficiencies not available via other methods for performing convolution operations.

EXAMPLE EMBODIMENTS

Example 1: A computer-implemented method comprising (1) maintaining, within an LMD included in a hardware accelerator (a) a filter matrix corresponding to a filter location included in each of a set of filters of a convolutional layer of an ANN, and (b) a set of activation vectors corresponding to an active region of an activation volume input into the convolutional layer, (2) determining that the active region of the activation volume is contiguous with a padding region associated with at least a portion of the activation volume, and (3) directing an MMU included in the hardware accelerator to execute a matrix multiplication operation (MMO) using the filter matrix and an activation matrix comprising (a) the set of activation vectors, and (b) at least one padding vector corresponding to the padding region.

Example 2: The computer-implemented method of example 1, wherein (1) the LMD comprises (a) a set of multiplier registers associated with the MMU, and (b) a set of multiplicand registers associated with the MMU, (2) maintaining the filter matrix within the LMD comprises loading, from a data store, the filter matrix to the set of multiplier registers, and (3) maintaining the set of activation vectors within the LMD comprises loading, from the data store, the set of activation vectors to the set of multiplicand registers.

Example 3: The computer-implemented method of example 2, wherein directing the MMU to execute the MMO using the filter matrix and the activation matrix comprises directing the hardware accelerator to include a padding value in a multiplicand register included in the set of multiplicand registers corresponding to the padding region.

Example 4: The computer-implemented method of any of examples 2-3, wherein (1) the hardware accelerator further comprises a set of output activation registers associated with the MMU, and (2) directing the MMU to execute the MMO using the filter matrix and the activation matrix comprises (a) for each multiplicand register that includes an activation vector included in the active region of the activation volume (i) directing the MMU to execute a dot product operation using a filter vector included in the filter matrix and the activation vector, and (ii) storing a result of the dot product operation in the set of output activation registers, and (b) for each multiplicand register that corresponds to the padding region, storing a padding value in the set of output activation registers.

Example 5: The computer-implemented method of any of examples 1-4, wherein directing the MMU to execute the MMO using the filter matrix and the activation matrix comprises directing the MMU to execute the MMO using the filter matrix as a multiplier matrix and the activation matrix as a multiplicand matrix.

Example 6: The computer-implemented method of example 6, wherein (1) the filter matrix comprises a set of filter vectors corresponding to a filter location included in each of a set of filters of a convolutional layer of an ANN, (2) each activation vector in the set of activation vectors comprises a set of channel values corresponding to a location within the activation volume, and (3) the active region comprises at least a portion of a row of activation vectors included in the activation volume.

Example 7: The computer-implemented method of example 7, wherein (1) the multiplier matrix comprises (a) a multiplier matrix height dimension, and (b) a multiplier matrix width dimension, and (2) the multiplicand matrix comprises (a) a multiplicand matrix height dimension comprising the multiplier matrix width dimension, and (b) a multiplicand matrix width dimension.

Example 8: The computer-implemented method of example 8, wherein (1) the activation matrix comprises a number of activation vectors no greater than the multiplier matrix height dimension, and (2) each filter vector included in the set of filter vectors comprises a predetermined number of filter weight values, wherein (a) the predetermined number of filter weight values is at most the multiplier matrix width dimension, and (b) each filter weight value included in the filter vector corresponds to a different channel included in a set of channels associated with each of the set of filters.

Example 9: The computer-implemented method of any of examples 1-8, further comprising (1) replacing (a) the filter matrix with an additional filter matrix corresponding to an additional filter location, and (b) at least one activation vector included in the set of activation vectors with an additional activation vector included in the activation volume, and (2) directing the MMU to execute an additional MMO using the additional filter matrix and the activation matrix.

Example 10: The computer-implemented method of example 9, wherein (1) the hardware accelerator further comprises a set of output activation registers associated with the MMU, and (2) directing the MMU to execute the MMO using the filter matrix and the activation matrix further comprises (a) generating a primary result matrix by directing the MMU to execute the MMO using the filter matrix as a multiplier matrix and the activation matrix as a multiplicand matrix, and (b) storing the primary result matrix within the set of output activation registers.

Example 11: The computer-implemented method of example 10, wherein directing the MMU to execute the additional MMO using the additional filter matrix and the activation matrix further comprises (1) producing a secondary result matrix by directing the MMU to execute the additional MMO using the additional filter matrix as the multiplier matrix and the activation matrix as the multiplicand matrix, (2) accumulating the secondary result matrix and the primary result matrix, and (3) storing a result of accumulating the secondary result matrix and the primary result matrix within the set of output activation registers.

Example 12: The computer-implemented method of example 11, wherein the computer-implemented method further comprises determining, based on the result of accumulating the secondary result matrix and the primary result matrix, a set of output activation values for the convolutional layer of the ANN.

Example 13: The computer-implemented method of any of examples 1-12, wherein directing the MMU to execute an MMO comprises directing the MMU to execute a generalized matrix multiplication (GEMM) operation.

Example 14: The computer-implemented method of any of examples 1-13, wherein the activation volume comprises a digital image comprising (1) at least one row of activation values, (2) at least one column of activation values, and (3) at least one channel of activation values.

Example 15: A system comprising (1) a hardware accelerator comprising (a) a MMU, and (b) a LMD, (2) a maintaining module, stored in memory, that maintains, within the LMD (a) a filter matrix corresponding to a filter location included in each of a set of filters of a convolutional layer of an ANN, and (b) a set of activation vectors corresponding to an active region of an activation volume input into the convolutional layer, (3) a determining module, stored in memory, that determines that the active region of the activation volume is contiguous with a padding region associated with at least a portion of the activation volume, and (4) a directing module, stored in memory, that directs the MMU to execute a matrix multiplication operation (MMO) using the filter matrix and an activation matrix comprising (a) the set of activation vectors, and (b) at least one padding vector corresponding to the padding region, and (5) at least one physical processor that executes the maintaining module, the determining module, and the directing module.

Example 16: The system of example 15, wherein (1) the LMD comprises (a) a set of multiplier registers associated with the MMU, and (b) a set of multiplicand registers associated with the MMU, and (2) the maintaining module (a) maintains the filter matrix within the LMD by loading, from a data store, the filter matrix to the set of multiplier registers, and (b) maintains the set of activation vectors within the LMD comprises loading, from the data store, the set of activation vectors to the set of multiplicand registers.

Example 17: The system of example 16, wherein the directing module directs the MMU to execute the MMO using the filter matrix and the activation matrix by directing the hardware accelerator to include a padding value in a multiplicand register included in the set of multiplicand registers corresponding to the padding region.

Example 18: The system of example 17, wherein (1) the hardware accelerator further comprises a set of output activation registers associated with the MMU, and (2) the directing module directs the MMU to execute the MMO using the filter matrix and the activation matrix by (a) for each multiplicand register that includes an activation vector included in the active region of the activation volume (i) directing the MMU to execute a dot product operation using a filter vector included in the filter matrix and the activation vector, and (ii) storing a result of the dot product operation in the set of output activation registers, and (b) for each multiplicand register that corresponds to the padding region, storing a padding value in the set of output activation registers.

Example 19: The system of any of examples 15-18, wherein the directing module further (1) replaces (a) the filter matrix with an additional filter matrix corresponding to an additional filter location, and (b) at least one activation vector included in the set of activation vectors with an additional activation vector included in the activation volume, and (2) directs the MMU to execute an additional MMO using the additional filter matrix and the activation matrix.

Example 20: A non-transitory computer-readable medium comprising computer-readable instructions that, when executed by at least one processor of a computing system, cause the computing system to (1) maintain, within an LMD included in a hardware accelerator (a) a filter matrix corresponding to a filter location included in each of a set of filters of a convolutional layer of an ANN, and (b) a set of activation vectors corresponding to an active region of an activation volume input into the convolutional layer, (2) determine that the active region of the activation volume is contiguous with a padding region associated with at least a portion of the activation volume, and (3) direct an MMU included in the hardware accelerator to execute a matrix multiplication operation (MMO) using the filter matrix and an activation matrix comprising (a) the set of activation vectors, and (b) at least one padding vector corresponding to the padding region.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive filter data and/or activation (e.g., image) data to be transformed, transform the filter data and/or activation data, output a result of the transformation to perform a convolution operation for a convolutional layer of an ANN, use the result of the transformation to provide input to one or more additional layers of the ANN, and store the result of the transformation to make predictions regarding additional inputs to the ANN. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. A computer-implemented method comprising:
maintaining, within a local memory device (LMD) included in a hardware accelerator:

a filter matrix corresponding to a filter location included in each of a set of filters of a convolutional layer of an artificial neural network (ANN); and a set of activation vectors corresponding to an active region of an activation volume input into the convolutional layer;

determining that the active region of the activation volume is contiguous with a padding region associated with at least a portion of the activation volume; and directing a matrix multiplication unit (MMU) included in the hardware accelerator to execute a matrix multiplication operation (MMO) using the filter matrix and an activation matrix comprising:

the set of activation vectors; and at least one padding vector corresponding to the padding region.

2. The computer-implemented method of claim 1, wherein:

the LMD comprises:

a set of multiplier registers associated with the MMU; and a set of multiplicand registers associated with the MMU;

maintaining the filter matrix within the LMD comprises loading, from a data store, the filter matrix to the set of multiplier registers; and maintaining the set of activation vectors within the LMD comprises loading, from the data store, the set of activation vectors to the set of multiplicand registers.

3. The computer-implemented method of claim 2, wherein directing the MMU to execute the MMO using the filter matrix and the activation matrix comprises directing the hardware accelerator to include a padding value in a multiplicand register included in the set of multiplicand registers corresponding to the padding region.

4. The computer-implemented method of claim 2, wherein:

the hardware accelerator further comprises a set of output activation registers associated with the MMU; and directing the MMU to execute the MMO using the filter matrix and the activation matrix comprises:

for each multiplicand register that includes an activation vector included in the active region of the activation volume:

directing the MMU to execute a dot product operation using a filter vector included in the filter matrix and the activation vector; and storing a result of the dot product operation in the set of output activation registers; and for each multiplicand register that corresponds to the padding region, storing a padding value in the set of output activation registers.

5. The computer-implemented method of claim 1, wherein directing the MMU to execute the MMO using the filter matrix and the activation matrix comprises directing the MMU to execute the MMO using the filter matrix as a multiplier matrix and the activation matrix as a multiplicand matrix.

6. The computer-implemented method of claim 5, wherein:

the filter matrix comprises a set of filter vectors corresponding to a filter location included in each of a set of filters of the convolutional layer of the artificial neural network; and each activation vector in the set of activation vectors comprises a set of channel values corresponding to a location within the activation volume; and the active region comprises at least a portion of a row of activation vectors included in the activation volume.

7. The computer-implemented method of claim 6, wherein:

the multiplier matrix comprises:

a multiplier matrix height dimension; and a multiplier matrix width dimension; and the multiplicand matrix comprises:

a multiplicand matrix height dimension comprising the multiplier matrix width dimension; and a multiplicand matrix width dimension.

8. The computer-implemented method of claim 7, wherein:

the activation matrix comprises a number of activation vectors no greater than the multiplier matrix height dimension; and each filter vector included in the set of filter vectors comprises a predetermined number of filter weight values, wherein:

the predetermined number of filter weight values is at most the multiplier matrix width dimension; and each filter weight value included in the filter vector corresponds to a different channel included in a set of channels associated with each of the set of filters.

9. The computer-implemented method of claim 1, further comprising:

replacing:

the filter matrix with an additional filter matrix corresponding to an additional filter location; and at least one activation vector included in the set of activation vectors with an additional activation vector included in the activation volume; and directing the MMU to execute an additional MMO using the additional filter matrix and the activation matrix.

10. The computer-implemented method of claim 9, wherein:

the hardware accelerator further comprises a set of output activation registers associated with the MMU; and directing the MMU to execute the MMO using the filter matrix and the activation matrix further comprises:

generating a primary result matrix by directing the MMU to execute the MMO using the filter matrix as a multiplier matrix and the activation matrix as a multiplicand matrix; and storing the primary result matrix within the set of output activation registers.

11. The computer-implemented method of claim 10, wherein directing the MMU to execute the additional MMO using the additional filter matrix and the activation matrix further comprises:

producing a secondary result matrix by directing the MMU to execute the additional MMO using the additional filter matrix as the multiplier matrix and the activation matrix as the multiplicand matrix;

accumulating the secondary result matrix and the primary result matrix; and storing a result of accumulating the secondary result matrix and the primary result matrix within the set of output activation registers.

12. The computer-implemented method of claim 11, wherein the computer-implemented method further comprises determining, based on the result of accumulating the secondary result matrix and the primary result matrix, a set of output activation values for the convolutional layer of the ANN.

13. The computer-implemented method of claim 1, wherein directing the MMU to execute an MMO comprises directing the MMU to execute a generalized matrix multiplication (GEMM) operation.

14. The computer-implemented method of claim 1, wherein the activation volume comprises a digital image comprising:
- at least one row of activation values;
- at least one column of activation values; and
- at least one channel of activation values.

15. A system comprising:
- a hardware accelerator comprising:
  - a matrix multiplication unit (MMU); and
  - a local memory device (LMD);
- a maintaining module, stored in memory, that maintains, within the LMD:
  - a filter matrix corresponding to a filter location included in each of a set of filters of a convolutional layer of an artificial neural network (ANN); and
  - a set of activation vectors corresponding to an active region of an activation volume input into the convolutional layer;
- a determining module, stored in memory, that determines that the active region of the activation volume is contiguous with a padding region associated with at least a portion of the activation volume; and
- a directing module, stored in memory, that directs the MMU to execute a matrix multiplication operation (MMO) using the filter matrix and an activation matrix comprising:
  - the set of activation vectors; and
  - at least one padding vector corresponding to the padding region; and
- at least one physical processor that executes the maintaining module, the determining module, and the directing module.

16. The system of claim 15, wherein:
the LMD comprises:
- a set of multiplier registers associated with the MMU; and
- a set of multiplicand registers associated with the MMU; and the maintaining module:
- maintains the filter matrix within the LMD by loading, from a data store, the filter matrix to the set of multiplier registers; and
- maintains the set of activation vectors within the LMD comprises loading, from the data store, the set of activation vectors to the set of multiplicand registers.

17. The system of claim 16, wherein the directing module directs the MMU to execute the MMO using the filter matrix and the activation matrix by directing the hardware accelerator to include a padding value in a multiplicand register included in the set of multiplicand registers corresponding to the padding region.

18. The system of claim 17, wherein:
the hardware accelerator further comprises a set of output activation registers associated with the MMU; and
the directing module directs the MMU to execute the MMO using the filter matrix and the activation matrix by:
- for each multiplicand register that includes an activation vector included in the active region of the activation volume:
  - directing the MMU to execute a dot product operation using a filter vector included in the filter matrix and the activation vector; and
  - storing a result of the dot product operation in the set of output activation registers; and
- for each multiplicand register that corresponds to the padding region, storing a padding value in the set of output activation registers.

19. The system of claim 15, wherein the directing module further:
replaces:
- the filter matrix with an additional filter matrix corresponding to an additional filter location; and
- at least one activation vector included in the set of activation vectors with an additional activation vector included in the activation volume; and directs the MMU to execute an additional MMO using the additional filter matrix and the activation matrix.

20. A non-transitory computer-readable medium comprising computer-readable instructions that, when executed by at least one processor of a computing system, cause the computing system to:
maintain, within a local memory device (LMD) included in a hardware accelerator:
- a filter matrix corresponding to a filter location included in each of a set of filters of a convolutional layer of an artificial neural network (ANN); and
- a set of activation vectors corresponding to an active region of an activation volume input into the convolutional layer;

determine that the active region of the activation volume is contiguous with a padding region associated with at least a portion of the activation volume; and direct a matrix multiplication unit (MMU) included in the hardware accelerator to execute a matrix multiplication operation (MMO) using the filter matrix and an activation matrix comprising:
- the set of activation vectors; and
- at least one padding vector corresponding to the padding region.

* * * * *